United States Patent
Hinokio et al.

(10) Patent No.: US 10,521,183 B2
(45) Date of Patent: Dec. 31, 2019

(54) CONTROL TERMINAL DEVICE AND AUDIO SYSTEM CONTROL METHOD THAT DISPLAYS A SOURCE SELECTION SCREEN WITH AN AREA IMAGE BACKGROUND

(71) Applicant: Yamaha Corporation, Shizuoka (JP)

(72) Inventors: Akie Hinokio, Tokyo (JP); Masaharu Ohno, Hamamatsu (JP); Kazuya Muchikabe, Hamamatsu (JP); Akihiko Suyama, Hamamatsu (JP); Keisuke Tsukada, Hamamatsu (JP); Shinichiro Kato, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 63 days.

(21) Appl. No.: 15/843,732

(22) Filed: Dec. 15, 2017

(65) Prior Publication Data
US 2018/0121158 A1    May 3, 2018

Related U.S. Application Data

(63) Continuation of application No. PCT/JP2016/067926, filed on Jun. 16, 2016.

(30) Foreign Application Priority Data

Jun. 16, 2015   (JP) ................................ 2015-121469

(51) Int. Cl.
*G06F 3/16* (2006.01)
*G06F 3/048* (2013.01)
(Continued)

(52) U.S. Cl.
CPC .............. *G06F 3/165* (2013.01); *G06F 3/048* (2013.01); *G06F 3/0482* (2013.01);
(Continued)

(58) Field of Classification Search
None
See application file for complete search history.

(56) References Cited

U.S. PATENT DOCUMENTS 8,290,603 B1    10/2012    Lambourne
9,344,292 B2 *   5/2016    Griffiths .............. H04L 12/2809
(Continued)

FOREIGN PATENT DOCUMENTS

JP    2005-198315 A    7/2005
JP    2008-160581 A    7/2008
(Continued)

OTHER PUBLICATIONS

Extended European Search Report issued in counterpart European Application No. 16811697.8 dated Nov. 28, 2018 (seven (7) pages).
(Continued)

*Primary Examiner* — Jennifer N To
*Assistant Examiner* — Joseph R. Burwell
(74) *Attorney, Agent, or Firm* — Crowell & Moring LLP

(57) ABSTRACT

A control terminal device includes a display, at least one processor, and a memory configured to store instructions, when executed by the at least one processor, cause the control terminal device to transmit command messages to the plurality of communication devices disposed in respective areas and connected via a network, and to display on the display an operation screen, a device selection screen for selecting any one of the plurality of communication devices, and area images indicating the areas in which the respective communication devices are disposed so as to serve as a selection operation section for selecting the respective communication devices.

7 Claims, 16 Drawing Sheets

(51) Int. Cl.
  *G06F 13/00*    (2006.01)
  *G10K 15/02*    (2006.01)
  *G06F 3/0481*   (2013.01)
  *G06F 3/0482*   (2013.01)
  *H04R 3/12*     (2006.01)
  *H04R 27/00*    (2006.01)

(52) U.S. Cl.
  CPC .......... *G06F 3/04817* (2013.01); *G06F 13/00* (2013.01); *G10K 15/02* (2013.01); *H04R 3/12* (2013.01); *H04R 27/00* (2013.01); *H04R 2227/005* (2013.01)

(56) References Cited

U.S. PATENT DOCUMENTS

| | | | |
|---|---|---|---|
| 9,395,877 B2* | 7/2016 | Reimann | G06F 3/0486 |
| 9,395,878 B2* | 7/2016 | Reimann | G06F 3/0486 |
| 9,483,230 B1* | 11/2016 | Bates | G06F 3/04847 |
| 9,671,997 B2* | 6/2017 | Triplett | G06F 3/165 |
| 9,766,853 B2* | 9/2017 | Kallai | G11B 19/02 |
| 2003/0236582 A1 | 12/2003 | Zamir et al. | |
| 2004/0225519 A1 | 11/2004 | Martin | |
| 2005/0021470 A1 | 1/2005 | Martin et al. | |
| 2005/0146444 A1 | 7/2005 | Allen et al. | |
| 2008/0177822 A1 | 7/2008 | Yoneda | |
| 2010/0299639 A1* | 11/2010 | Ramsay | G06F 3/0486 |
| | | | 715/835 |
| 2013/0251329 A1* | 9/2013 | McCoy | H04N 21/654 |
| | | | 386/201 |
| 2014/0006587 A1* | 1/2014 | Kusano | H04N 21/41407 |
| | | | 709/224 |
| 2014/0176299 A1* | 6/2014 | Kumar | G06F 3/165 |
| | | | 340/4.42 |
| 2014/0181655 A1* | 6/2014 | Kumar | G06F 3/165 |
| | | | 715/716 |
| 2015/0113564 A1 | 4/2015 | Mushikabe | |
| 2015/0143249 A1 | 5/2015 | Sasaki et al. | |

FOREIGN PATENT DOCUMENTS

| | | |
|---|---|---|
| JP | 2010-26964 A | 2/2010 |
| JP | 2013-251594 A | 12/2013 |
| JP | 5727110 B2 | 6/2015 |

OTHER PUBLICATIONS

Nicolas, "Sonos 5.3: New App. Today. Still no Spotify Radio", https://web.archive.org/web/20150306170032/https://www.iphone-ticker.de-sonos-5-3-neue-app-heute-noch-immer-ohne-spotify-radio-78310, Mar. 6, 2015, XP055524647, with English translation, pp. 1-9, (14 pages).

Japanese-language Office Action issued in counterpart Japanese Application No. 2015-121469 dated Jan. 29, 2019 with English translation (five (5) pages).

International Preliminary Report on Patentability (PCT/IB/338 & PCT/IB/373) issued in PCT Application No. PCT/JP2016/067926 dated Dec. 19, 2017, including English translation of document C2 (Japanese-language Written Opinion (PCT/ISA/237)) previously filed on Dec. 15, 2017 (Ten (10) pages).

International Search Report (PCT/ISA/210) issued in PCT Application No. PCT/JP2016/067926 dated Jul. 12, 2016 with English translation (five pages).

* cited by examiner

FIG. 8

AUDIO SYSTEM TABLE 90

| | IP ADDRESS | MAC ADDRESS 1 | MAC ADDRESS 2 | SSID | DEVICE NAME | GROUP | DISPOSITION ROOM | CONNEC-TION | SERVICE |
|---|---|---|---|---|---|---|---|---|---|
| AUDIO DEVICE 11 | 192.158.1.10 | xx-xx-xx-xx-xx-xx | xx-xx-xx-xx-xx-xx | xxxxx-xxxx-xxxx-xxxx | CD Player | 1A | A1 (office room) | 1 | CD TUNER NET DISTRIBUTION |
| AUDIO DEVICE 12 | 192.158.1.11 | xx-xx-xx-xx-xx-xx | xx-xx-xx-xx-xx-xx | xxxxx-xxxx-xxxx-xxxx | CD Player | 1B | A2 (dining room) | 2 | CD NET DISTRIBUTION |
| AUDIO DEVICE 13 | 192.158.1.12 | xx-xx-xx-xx-xx-xx | xx-xx-xx-xx-xx-xx | xxxxx-xxxx-xxxx-xxxx | AV Reciever | 1B | A3 (bedroom) | 2 | TUNER NET RADIO NET DISTRIBUTION |
| AUDIO DEVICE 14 | 192.158.1.13 | xx-xx-xx-xx-xx-xx | xx-xx-xx-xx-xx-xx | xxxxx-xxxx-xxxx-xxxx | Set Top Box | — | A4 (living room) | 1 | CATV |

*FIG. 9*

ROOM TABLE 110

| ROOM ID | AREA NAME | BACKGROUND IMAGE |
|---|---|---|
| A1 | Office | XXXX.jpg |
| A2 | Dining room | XXXX.jpg |
| A3 | Bedroom | XXXX.jpg |
| A4 | Living room | XXXX.jpg |
| A5 | Room1 | XXXX.jpg |
| A6 | Room2 | XXXX.jpg |

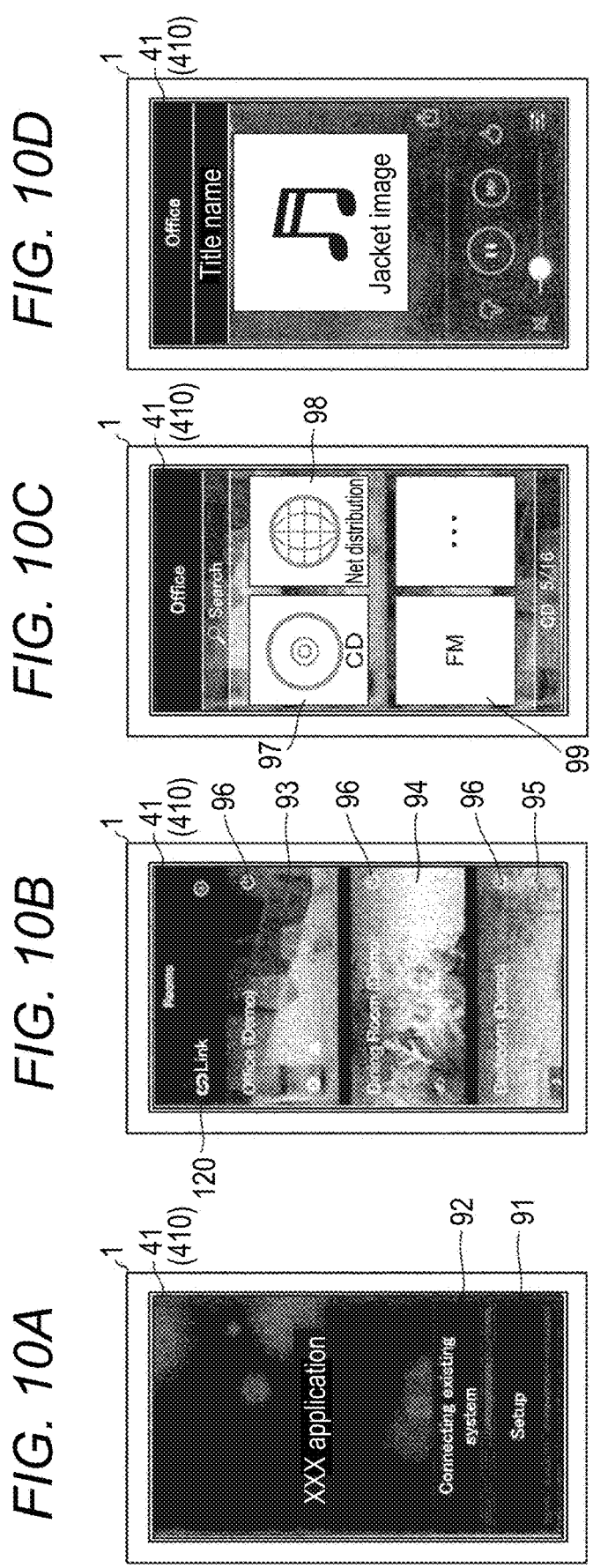

CONTROL TERMINAL DEVICE AND AUDIO SYSTEM CONTROL METHOD THAT DISPLAYS A SOURCE SELECTION SCREEN WITH AN AREA IMAGE BACKGROUND

CROSS REFERENCE TO RELATED APPLICATIONS

This application is a continuation of PCT application No. PCT/JP2016/067926, which was filed on Jun. 16, 2016 based on Japanese Patent Application (Patent Application No. 2015-121469) filed on Jun. 16, 2015, the contents of which are incorporated herein by reference.

BACKGROUND OF THE INVENTION

1. Field of the Invention

The present invention relates to a control terminal device for controlling a plurality of communication devices disposed in respective areas and connected to the control terminal device via a network, and further relates to an audio system and an audio system control method.

2. Description of the Related Art

A system is available in which a plurality of reproduction devices, such as audio devices, disposed in respective rooms (areas), such as a living room and a bedroom, is connected to a network, such as a LAN, and a control terminal device controls, for example, the reproduction of the contents of the respective audio devices (for example, refer to JP-A-2013-251594). On the control terminal device, the user can select an audio device that is desired to be used for reproduction or the like and can perform the reproduction or the like of a source that can be serviced by the selected audio device.

In the above-mentioned configuration in which the user selects an audio device, it is difficult to specify at which place the audio device is disposed, and in some cases it is difficult to specify the audio device disposed in a place where reproduction is desired to be performed. The user sometimes desires to select an audio device from the place where the audio device is disposed.

SUMMARY OF THE INVENTION

The present invention is intended to provide a control terminal device, an audio system and an audio system control method capable of easily selecting an audio device for each area in which an audio device is disposed.

A control terminal device provided by an embodiment of the present invention includes a display, at least one processor, and a memory configured to store instructions, when executed by the at least one processor, cause the control terminal device to transmit command messages to the plurality of communication devices disposed in respective areas and connected via a network, and to display on the display an operation screen, a device selection screen for selecting any one of the plurality of communication devices, and area images indicating the areas in which the respective communication devices are disposed so as to serve as a selection operation section for selecting the respective communication devices.

BRIEF DESCRIPTION OF THE DRAWINGS

FIG. 8 is a view showing an example of an audio system table;

FIG. 9 is a view showing an example of a room table;

FIGS. 10A to 10D are views showing examples of the operation screens of the mobile phone;

DETAILED DESCRIPTION OF THE EXEMPLARY EMBODIMENTS

Figure 1:
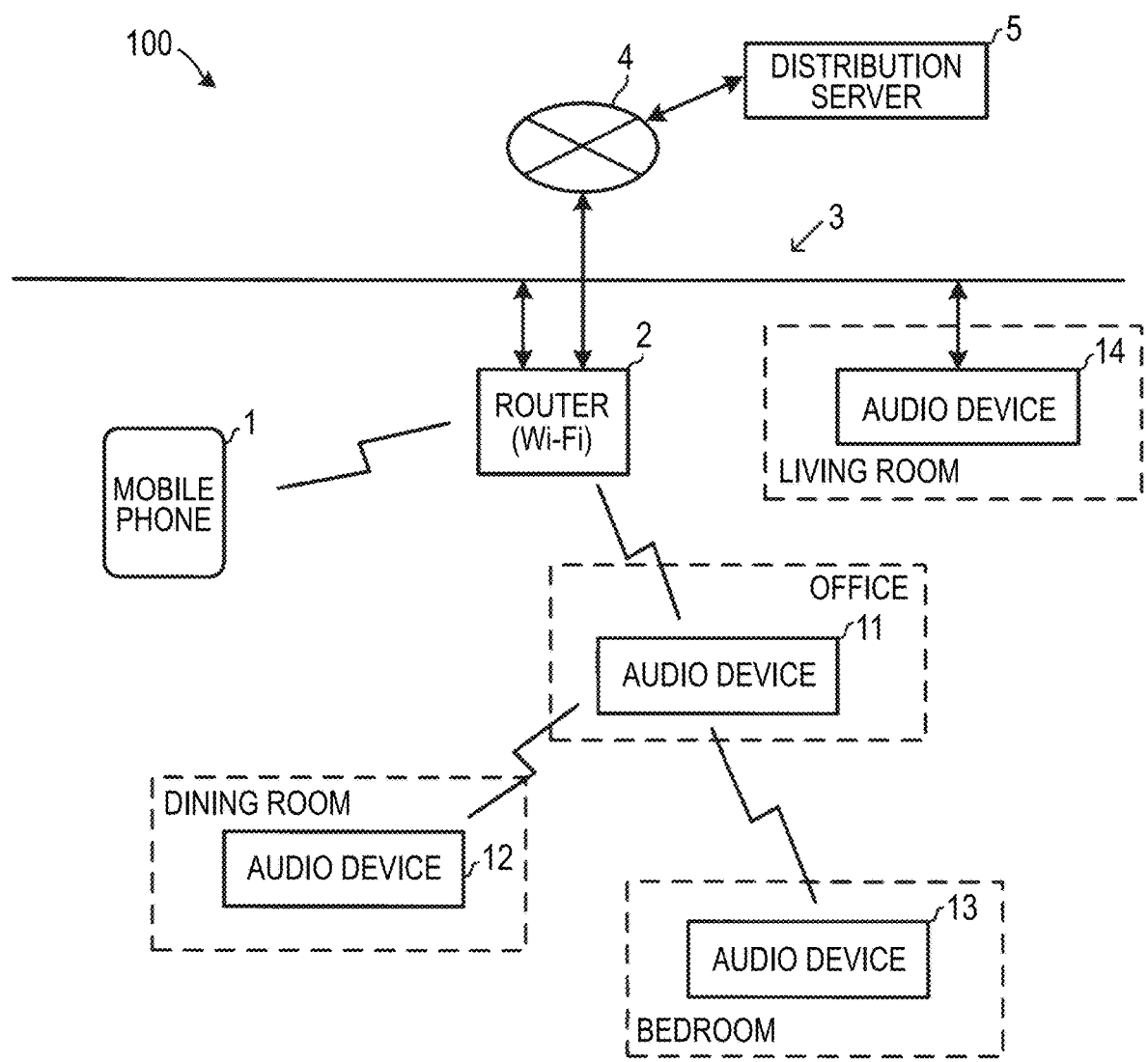
FIG. 1 is a view showing a configuration of an audio system 100 to which the present invention is applied.

FIG. 1 is a view showing a configuration of an audio system 100 to which the present invention is applied. The audio system 100 has a mobile phone (controller) 1, a distribution server 5 and a plurality of audio devices 11 to 14 mutually connected via a network 3 including a router 2 (Wi-Fi router). The network 3 includes a wired LAN and a wireless LAN. The mobile phone 1 functions as the controller 1 of the audio system 100 when an audio system control program 70 (see FIG. 2) is activated.

The distribution server 5 is connected to the network 3 via the Internet 4 through the wired LAN and distributes music piece data to the audio devices 11 to 14. The audio devices 11 to 13 are connected to the network 3 through the wireless LAN, and the audio device 14 is connected to the network 3 through the wired LAN. For example, Ethernet (registered trademark) (IEEE 802.3) may merely be used for the wired LAN, and Wi-Fi (IEEE 802.11g) may merely be used for the wireless LAN.

The audio devices 11 to 14 can be connected to both the wired LAN and wireless LAN, and when one of the devices is connected to the network 3, the device itself also functions as an access point that accepts wireless LAN connection from another audio device and connects the audio device to the network 3. In other words, each of the audio devices 11 to 14 is equipped with two high frequency communication sections (RF modules) for carrying out wireless LAN communication. Alternatively, each audio device may be equipped with one high frequency communication section and may carry out two wired LAN communication operations in time division.

In FIG. 1, the audio device 11 is directly connected to the router 2 through the wireless LAN. The audio device 12 and the audio device 13 are connected to the router 2 via the audio device 11 serving as an access point. Furthermore, the audio device 14 is connected to the router 2 through the wireless LAN. The audio devices 12, 13 and 14 also function as access points. Each of the access points 11 to 14, each audio device of the audio system also serving as an access point, is also referred to as a system access point and operates in a stealth mode usually (except for initial connection time described later), whereby its existence is hardly known by the other devices.

Moreover, as shown in FIG. 1, the respective audio devices 11 to 14 are disposed in respective rooms (areas), that is, an office, a dining room, a bedroom and a living room, in the same building.

In the audio system 100, out of the audio devices 11 to 14, the audio devices having been set as a group can perform synchronous reproduction of the same content. The content is, for example, a music piece. The music piece data stored on a CD, a hard disk, etc. provided in each of the audio devices 11 to 14 is used as the source of the content. Alternatively, the music piece data stored in the distribution server 5 as described above, is used as the source. The file formats of the music piece data are, for example, MP3, WAV, Sound VQ (registered trademark), WMA (registered trademark) and AAC.

As described above, when the audio system control program 70 serving as an application program is activated, the mobile phone 1 functions as the controller 1 of the audio system 100 and controls the reproduction sources, volume levels, etc. of the audio system 100 (the respective audio devices 11 to 14) via the network 3. Furthermore, the mobile phone serves as the controller 1 and sets a group in which synchronous reproduction is performed.

The respective audio devices 11 to 14 can mutually transmit and receive audio signals via the network 3. In order to connect the audio devices 11 to 14 to the network 3 through the wireless LAN, the user is required to set, for example, the SSID and the password of the connection destination; however, in this audio system 100, the user can connect the audio devices to the network 3 by simple operation, thanks to the configurations and functions of the controller 1 and the audio devices 11 to 14 as described below.

Figure 2:
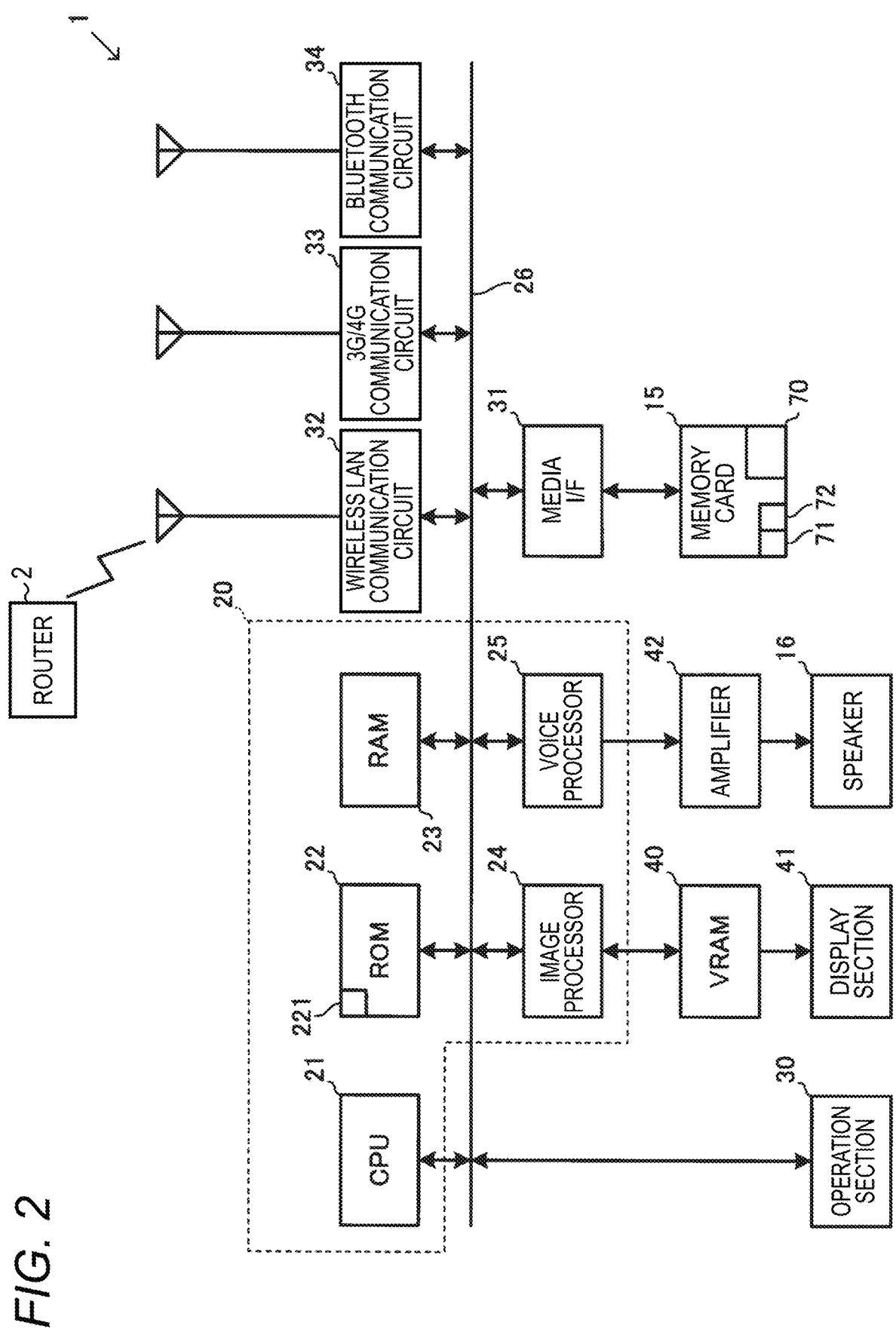
FIG. 2 is a block diagram of a mobile phone.

Next, the configuration of the mobile phone 1 will be described referring to the block diagram of FIG. 2. The mobile phone 1 is a multifunctional phone, a so-called smart phone. The mobile phone 1 has the 3G/4G communication function for mobile communication networks, the wireless LAN (Wi-Fi) communication function and the Bluetooth (registered trademark) communication function. By the activation of the audio system control program 70 being used as an application program, the mobile phone 1 functions as the controller 1, communicates with the respective audio devices 11 to 14 of the audio system 100 via the network 3, and transmits the command message corresponding to the operation of the user to the audio devices 11 to 4, thereby controlling the audio system 100.

On a bus 26, the mobile phone 1 has a control section 20, an operation section 30, a media interface 31, a Wi-Fi communication circuit 32, a 3G/4G communication circuit 33, and a Bluetooth (registered trademark) communication section 34. The control section 20 includes a CPU 21, a ROM (flash memory) 22, a RAM 23, an image processor 24, and a voice processor 25. A video RAM (VRAM) 40 is connected to the image processor 24, and a display section 41 is connected to the VRAM 40. The display section 41 includes a liquid crystal display. Standby screens, telephone numbers, etc. are displayed on the display. Furthermore, screens for controlling the respective audio devices 11 to 14 are displayed in the case that the mobile phone functions as the controller 1. An amplifier 42 including a D/A converter is connected to the voice processor 25, and a speaker 16 is connected to the amplifier 42.

The image processor 24 is equipped with a GPU (graphics processing unit) for generating various images, such as standby screens, telephone numbers, etc. In the case that the audio system control program 70 is activated, the image processor 24 generates the images of audio controllers shown in FIGS. 10 to 13 according to the instructions of the CPU 21 and develops the images on the VRAM 40. The images developed on the VRAM 40 are displayed on the display section 41.

The voice processor 25 has a DSP (digital signal processor) for encoding/decoding speech voice. The voice processor 25 outputs decoded/generated voice to the amplifier 42. The amplifier 42 amplifies this voice signal and outputs the signal to the speaker 16.

The wireless LAN communication circuit 32 carries out wireless communication with the router 2 according to a standard, such as IEEE 802.11g, and transmits/receives data and messages to/from the devices on the network 3, such as the audio devices 11 to 14. The 3G/4G communication circuit 33 carries out voice speech communication and data communication via mobile phone communication networks. The Bluetooth (registered trademark) communication section 34 communicates with other devices conforming to the Bluetooth (registered trademark) and transmits and receives audio signals, for example.

The operation section 30 includes a touch panel 410 (see FIG. 10) formed on the display section 41 and detects a touch operation and a flick operation on the touch panel 410. A memory card 15 is connected to the media interface 31. The memory card 15 is, for example, a micro SD card. The audio system control program 70 is stored in the memory card 15 or the ROM 22. In this embodiment, it is assumed that the audio system control program 70 is stored in the memory card 15.

However, the audio system control program 70 may be downloaded by the 3G/4G or wireless LAN data communication or may be stored in the ROM 22 or the memory card 15 in advance. Furthermore, a storage area 71 for storing the configuration (refer to an audio system table 90 in FIG. 8) of the audio system 100 is set in the memory card 15. Moreover, a storage area 72 for storing the information (refer to a room table 110 in FIG. 9) of the respective rooms in the building to which the audio system 100 is applied is set in the memory card 15.

In the ROM 22, basic programs for executing the speech and application programs of the mobile phone 1 are stored in the ROM 22. Furthermore, the ROM 22 is a flash memory and can store, for example, downloaded application programs in addition to the basic programs. In the RAM 23, a work area that is used when the CPU 20 executes the audio system control program 70 is set.

Figure 3:
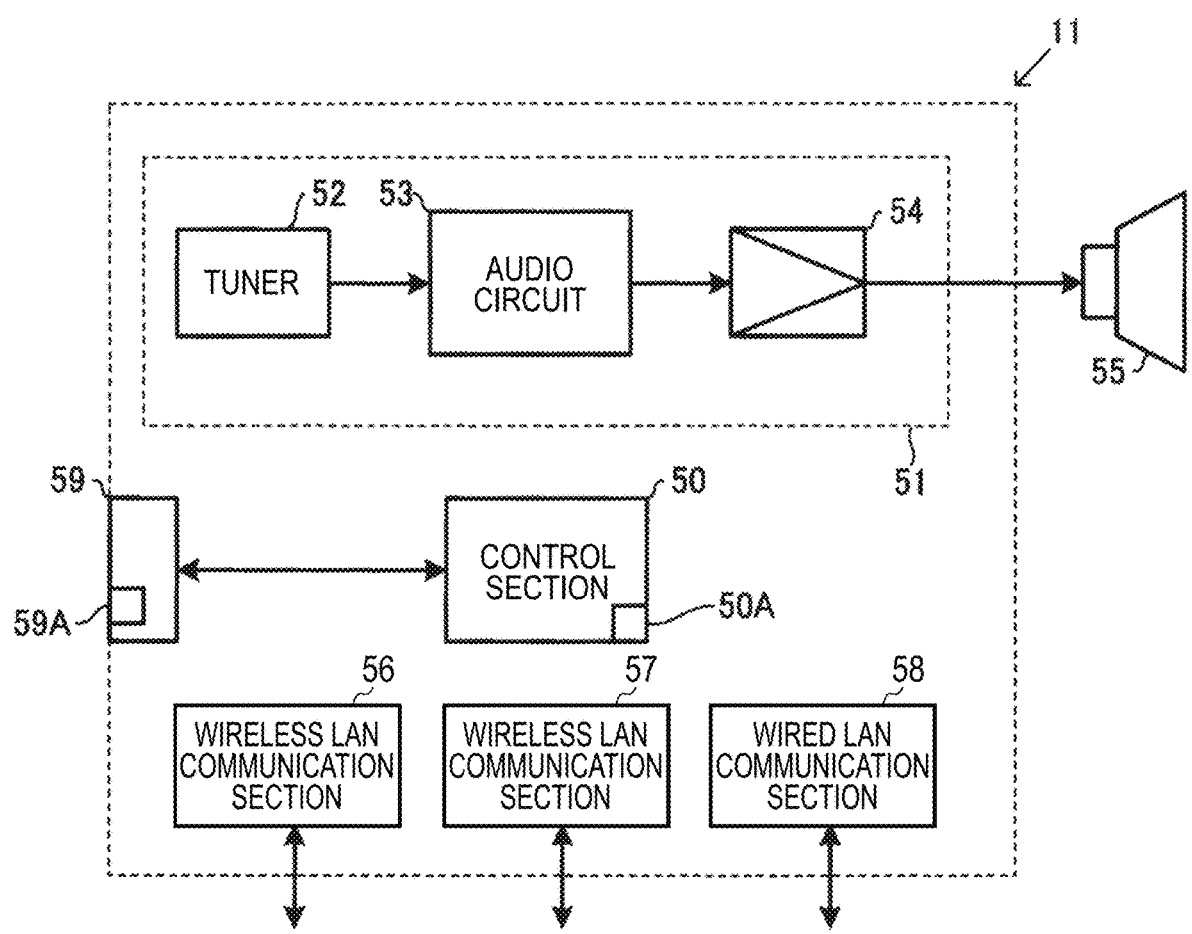
FIG. 3 is a block diagram of an audio device.

Next, the configuration of the audio device 11 will be described referring to FIG. 3. The audio device 11 has a control section 50, an audio processing section 51 and an operation section 59, and also has two wireless LAN communication sections (RF modules) 56 and 57 and a wired LAN communication section 58. The operation section 59 has a connect button 59A. The control section 50 includes a CPU and a memory and stores an audio system program 50A. The control section 50 controls the operations of the audio processing section 51, the wireless LAN communication sections 56 and 57 and the wired LAN communication section 58 by using the audio system program 50A. Hence, the audio device 11 functions as a reproducing device for reproducing contents and as a synchronous reproduction controller serving as a master for controlling synchronous reproduction.

Furthermore, when the connect button 59A is pressed, the control section 50 carries out an initial connection operation, i.e., an operation for connecting this audio device 11 to the network 3. The details of the initial connection operation will be described later.

The wireless LAN communication section 56 carries out wireless communication with a wireless access point, such as the router 2, according to a wireless LAN standard, such as IEEE 802.11g. Furthermore, the other wireless LAN communication section 57 is activated as an access point and relays the other audio devices (for example, the audio devices 12 and 13) to the network 3. Moreover, the wireless LAN communication section 57 is activated as an initial connection access point at the initial connection time of this audio device 11. The details of the initial connection access point will be described later. The two wireless LAN communication sections 56 and 57 may be achieved by operating a single piece of hardware in time division. The wired LAN communication section 58 has a cable connector and communicates with the router 2 according to a communication standard, such as IEEE 802.3.

The control section 50 communicates with the controller 1 via the network 3 and transmits operation states and receives command messages. Furthermore, the control section 50 transmits/receives required data to/from the respective audio devices 12, 13 and 14 via the network 3 at the time of synchronous reproduction.

The audio processing section 51 has a tuner 52, an audio circuit 53 and a power amplifier 54. The tuner 52 receives an audio signal from an FM broadcast or the Internet 4 and inputs the signal to the audio circuit 53. The audio circuit 53 carries out processes, such as equalizing and volume adjustment, for the input audio signal, and then outputs this processed audio signal to the power amplifier 54. The power amplifier 54 amplifies the input audio signal and outputs the audio signal to a speaker 55 connected externally. The speaker 55 emits the input audio signal as sound.

The basic configuration of the audio devices 12 to 14 is the same as that of the audio device 11 although there is a difference, for example, in the internal configuration of the audio processing section 51 because of the difference in reproduction source.

Next, the network connection process of the audio devices 11 to 14 in this audio system 100 will be described referring to FIGS. 4 to 7.

Figure 4:
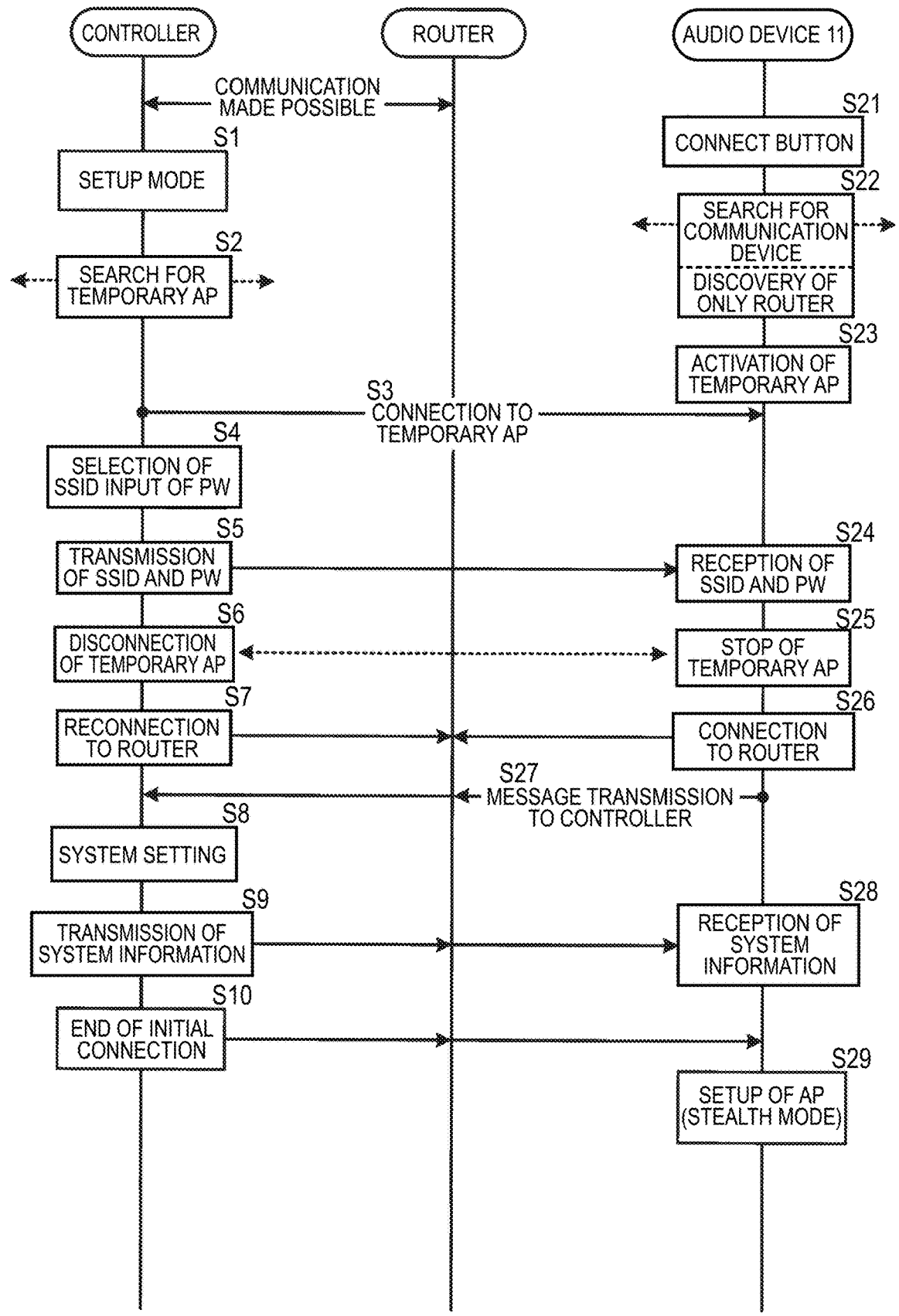
FIG. 4 is a view showing a procedure for initial connection of a first audio device.

FIG. 4 is a view showing a procedure in the case (initial connection) that the primary (first) audio device (herein the audio device 11) is connected to the router 2. The audio system control program 70 has been activated and the mobile phone 1 functions as the controller 1. The controller 1 enters a setup mode by user operation (by the touch operation on the setup button 91 shown in FIG. 10A) (at S1). Furthermore, before or after this step, the connect button 59A of the audio device 11 is pressed by the user (at S21). Hence, the controller 1 starts searching for an initial connection access point (temporary access point) (at S2), and the audio device 11 searches for a connectable wireless access point (at S22). In the scene shown in FIG. 4, the audio system 100 has not yet been constructed, and the audio device 11 serving as the first device is to be registered; hence, the audio device 11 discovers only the router 2 as a connectable access point. Since the audio device 11 is in its initial state (brand-new state) and does not have information, such as the SSID and the password (hereafter referred to as router information) required for the connection to the router 2, the audio device 11 cannot be connected to the router 2. Hence, the audio device 11 activates the initial connection access point serving as a temporary access point for use only at initial connection time in a stand-alone state to obtain the router information form the controller 1 (at S23). The controller 1 has preliminarily stored the SSID and the password of the initial connection access point. In other words, the SSID and the password have been preliminarily stored as data in the audio system control program 70. Hence, upon discovering this initial connection access point by the searching started at S2, the controller 1 releases the connection to the router 2 once and makes connection to the initial connection access point having been activated by the audio device 11 (at S3).

After that, the controller 1 carries out a procedure for transmitting the router information of the router 2 to the audio device 11 serving as the access point. The controller 1 that is achieved by installing the application program in the mobile phone 1 is highly likely unable to obtain the SSID and the password of the router 2 from the system program of the mobile phone 1, the controller 1 requests the user to input the SSID and the password (at S4). For the input of the SSID, it may be possible to use a method in which the list of the connection destinations (SSIDs) seen at the time is displayed on the display and the user is requested to select the SSID of the router 2. The user is requested to input the password (usually described on the main body of the router 2). The router information having been input is then transmitted to the audio device 11 that is connected as the temporary access point (at S5). And then, the audio device 11 receives the router information (at S24).

After transmitting the router information (SSID and PW) to the audio device 11, the controller 1 releases the connection to the initial connection access point (at S6). In parallel, upon receiving the router information, i.e., the SSID and the password of the router 2, from the controller 1, the audio device 11 stops the initial connection access point (at S25).

The controller 1 makes reconnection to the router 2, the connection to which was released at S3 (at S7). The audio device 11 also makes connection to the router 2 by using the obtained router information (at S26). Hence, the controller 1 and the audio device 11 can communicate with each other via the router 2 (the network 3). The audio device 11 herein first transmits to the controller 1 a message indicating that the connection to the router 2 is completed (at S27). Furthermore, the audio device 11 transmits device information together with the above-mentioned message. The device information includes information for individually identifying the audio device 11 (for example, the IP address, the MAC addresses of the wireless LAN communication sections 56 and 57, etc.), the information of disposition rooms, etc. After that, the controller 1 newly constructs the audio system 100 to which the audio device 11 belongs and registers the audio device 11 as the first audio device of the audio system 100 (at S8). More specifically, the controller 1 generates the audio system table 90 and registers the information of the audio device 11. And then, the controller 1 transmits the system information having been set for the audio device 11 (at S9). The system information is, for example, the name of the audio system and the number and the connection forms of the audio devices. After this step, the controller 1 ends the initial connection operation (at S10) and transmits the end of the operation to the audio device 11.

The audio device 11 receives the system information from the controller 1 (at S28). The audio device 11 then generates an SSID by using its own identification information and connection form (the number of hops=the number of steps from the apex in the tree-shaped connection form), activates the wireless LAN communication section 57 and sets up an access point that is identified by this SSID (at S29). This SSID can be identified as the SSID of the audio system by an audio device (having the audio system program 50A) (for example, the audio device 12 or 13) for this audio system. Furthermore, the password of the access point can be generated by using a specific calculation using the SSID. An audio device (having the audio system program 50A) (for example, the audio device 12 or 13) for this audio system can calculate this specific calculation. Hence, when another audio device (for example, the audio device 12 or 13) has discovered an access point (SSID), it is possible, on the basis of the SSID, to find out whether the access point is an audio device (for example, the audio device 11) of the audio system and to find out which position of the audio system the audio device 11 is connected to. Moreover, since each of the audio devices 12 and 13 can generate a password from the SSID, the audio device can make connection to the access point by itself without requiring information input from the user.

This access point operates in a stealth mode so as not to accept access from other devices during normal operation. Furthermore, as described later, at the time of the initial connection of the other audio devices 12 and 13, the access point releases the stealth mode, transmits a beacon and accepts the access from the audio devices 12 and 13 to be initially connected.

Figure 5:
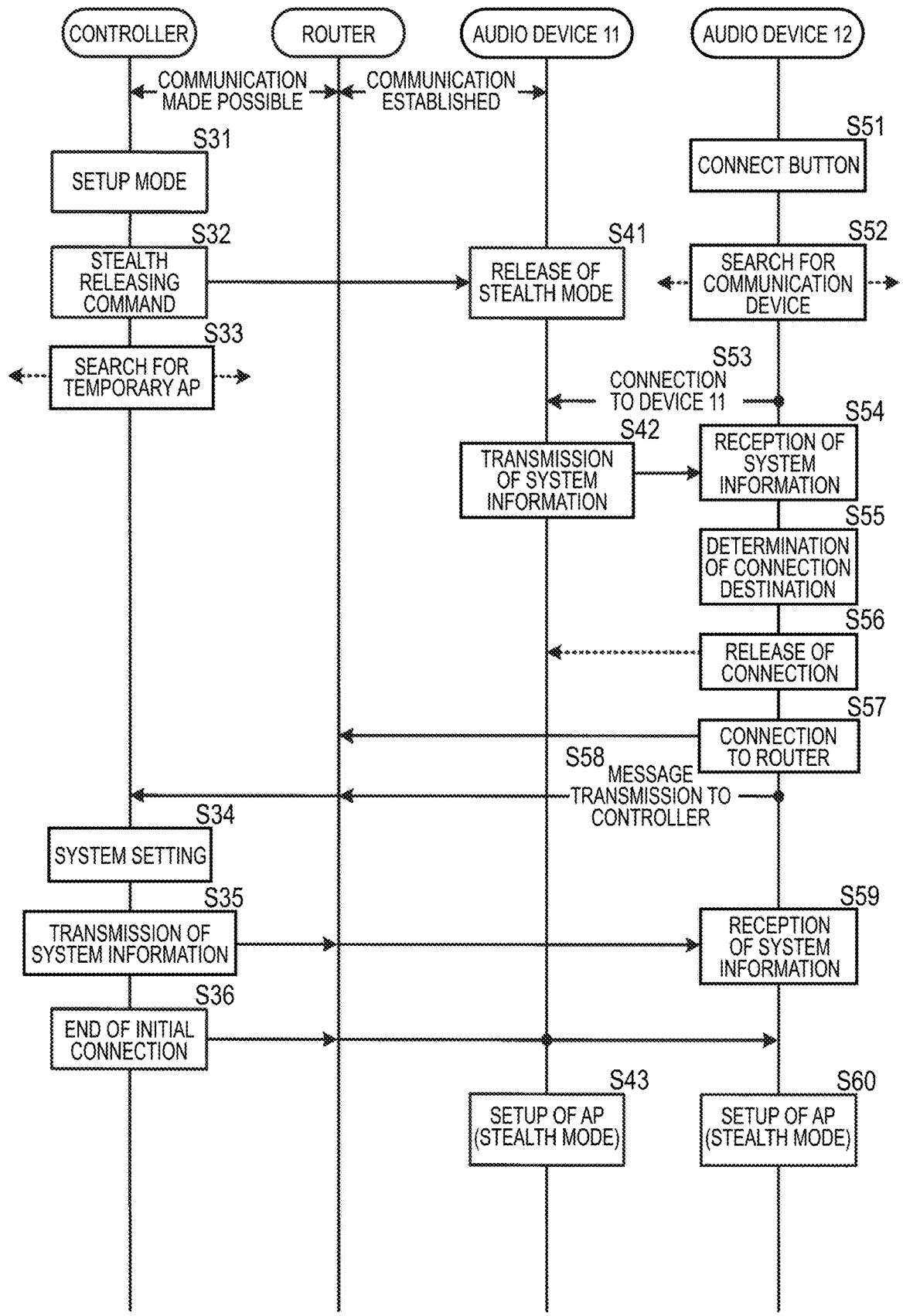
FIG. 5 is a view showing a procedure for initial connection of a second audio device.

FIG. 5 is a view showing a communication procedure in the case that the audio system is in a state of already having been constructed (in a state in which at least one audio device communicates with the controller 1 via the router 2 and receives the control performed by the controller 1) and in the case that a second audio device (for example, the audio device 12) is connected (initially connected) to the router 2. The following describes the communication procedure in the case that the audio system 100 to which the audio device 11 belong has been constructed and that the audio device 12 is to be additionally registered in the audio system 100.

When the controller 1 enters a setup mode by user operation (at S31), the controller first instructs the audio device (the audio device 11) having already been registered to release the stealth mode (at S32). Hence, the audio device 11 releases the stealth mode of the access point and transmits a beacon indicating its existence, thereby enabling access from other devices (at S41). Next, the controller 1 starts searching for an initial connection access point (temporary access point) (at S33). However, as described below, since the audio device 12 does not activate a temporary access point, the controller 1 continues the searching state at S33 (continues the wireless LAN connection with the router 2) and stands by until the controller receives a message from the audio device 12.

Furthermore, before or after this step, the connect button 59A of the audio device 12 is pressed by the user (at S51). Hence, the audio device 12 searches for a connectable wireless access point (at S52). The audio device 12 discovers a connectable access point by the searching at S52. In the case of this example of FIG. 5, the audio device 12 finds the router 2 and the audio device 11 (the access point 11), the stealth mode of which has been released. As described above, the access point 11 can be identified as a device of the audio system 100 as viewed from the audio device 12, and the audio device 12 can generate a password from the SSID and can make connection to the access point 11. The audio device 12 once makes connection to the access point 11 (the audio device 11) (at S53). Then, the audio device 12 obtains the system information of the audio system 100 from the audio device 11 (at S42 and S54). The system information includes the name of the system, the audio devices constituting the system and the connection forms of the audio devices, and router information, such as the SSID, password, etc. of the router 2. The audio devices 11 to 14 have been programmed so as to be allowed to transmit the router information to the devices of the same audio system 100. On the basis of the system information obtained from the discovered access point and the audio device 11, the audio device 12 determines the final connection destination (at S55). The determination of the connection destination is performed on the basis of the connection form (the number of hops) of the access point, the radio wave intensity of the access point, etc.

This figure shows a procedure in the case that the router 2 is determined as the connection destination. Upon determining that the router 2 is the connection destination (at S55), the audio device 12 releases the connection to the audio device 11 (at S56) and then makes connection to the router 2 by using the obtained router information (at S57). Since the controller 1 does not discover a temporary access point at S33 and remains connected to the router 2, the controller 1 and the audio device 12 can thus communicate with each other via the router 2 (the network 3). The audio device 12 herein first transmits to the controller 1 a message indicating that the connection to the router 2 is completed (at S58). Furthermore, the audio device 12 transmits the device information together with the above-mentioned message.

And then, the controller 1 registers this audio device 12 in the audio system 100 (the audio system table 90) and updates the system information (at S34), and transmits the system information to the audio device 12 (at S35). After this step, the controller 1 ends the setup mode (at S36). The updated system information and the setup mode ending message are transmitted to all the audio devices of the audio system. With the end of the setup mode, the audio devices 11 and 12 activate their access points in the stealth mode (at S43 and S60). At this time, the audio device 11 returns to the stealth mode.

In the case that the access point 11 (the audio devices 11) has been determined to be the connection destination at S55, the audio device 12 may merely jump the process from S55 to S58. In the message transmission at S58, the audio device 12 may merely transmit to the controller 1 a message indicating that the audio device itself has been connected to the network 3 via the access point 11.

The mutual communication procedure among the controller 1 and the audio devices 11 and 12 at the initial connection time of the first device and the second and subsequent devices has been described above. The operations of the controller 1 and the control sections of the audio devices 11 and 12 will be described below referring to flow charts in FIGS. 6 and 7.

Figure 6:
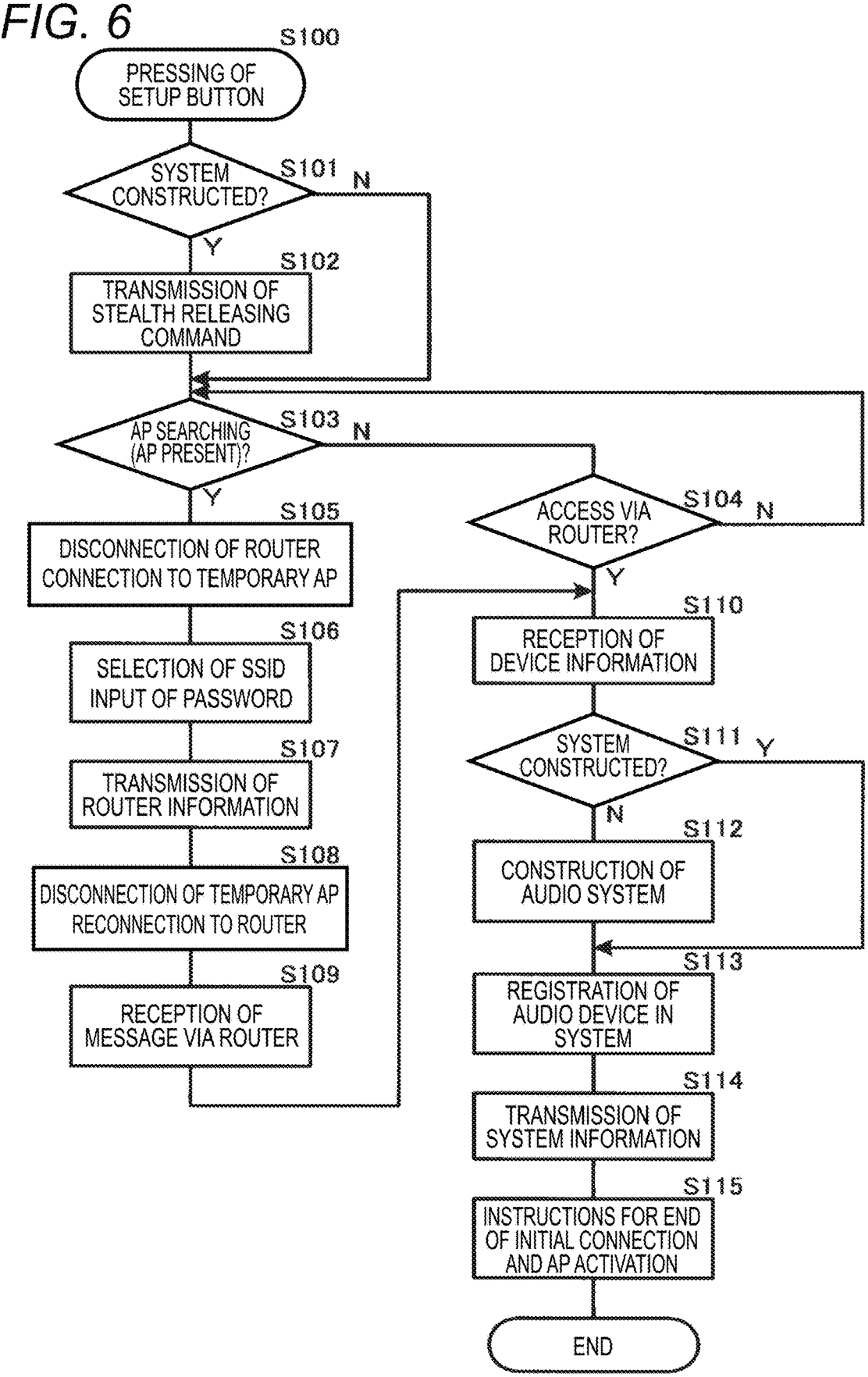
FIG. 6 is a flow chart showing the setup process of the control section of a controller.

FIG. 6 is a flow chart showing the setup process of the control section 20 of the controller 1. When the setup button 91 (see FIG. 10A) is pressed by the user (S100), this process is started. First, the control section judges whether the audio system 100 has already been constructed referring to the audio system table 90 (at S101). In the case that the audio system 100 has already been constructed (YES at S101), the control section transmits a command message indicating the release of the stealth mode to the audio devices belonging to the system (at S102). In the case that the audio system has not yet been constructed, the control section skips the operation at S101.

Next, the control section searches for whether the access point (temporary access point) for initial connection is present (at S103) and stands by until access is made from a new audio device via the network 3 (at S104).

In the case that a temporary access point is discovered (YES at S103), the control section releases the wireless LAN connection to the router 2 and makes connection to the temporary access point (at S105). And then, the control section causes the display section 41 to display a screen for selecting the SSID of the router 2 from among the SSIDs that are made seen by the wireless LAN communication circuit 32 and a screen for inputting the password of the router 2, and the user is requested to select the SSID and to enter the password (at S106). The control section transmits to the audio device having activated the temporary access point the SSID and the password (router information) having been input (at S107). And then, the control section releases the connection to this temporary access point and makes reconnection to the router 2 (at S108). After this, the control section receives a message from the audio device via the router (at S109) and starts communication via the network 3.

Furthermore, the control section receives the device information from the audio device through the communication via the network 3 (at S110). The control section judges whether an audio system has already been constructed (at S111); in the case that no audio system has been constructed (NO at S111), the control section constructs an audio system on the basis of the device information (at S112) and registers this audio device as a first device (at S113). More specifically, the control section generates the audio system table 90 and registers the information of the audio device.

In the case that the audio system 100 has already been constructed (YES at S111), the control section registers the device information received this time in the audio system 100 (the audio system table 90) (at S113). Then, the control section transmits the generated or updated system information to all the audio devices belonging to the audio system (at S114). After this step, the control section transmits a message indicating that the initial connection process is ended and that the access point is activated in the stealth mode (at S115), and then ends the setup mode process. On the other hand, in the case that access is made from a new audio device via the network 3 in a state in which no temporary access point is discovered (YES at S104), the process advances to step S110.

Figure 7:
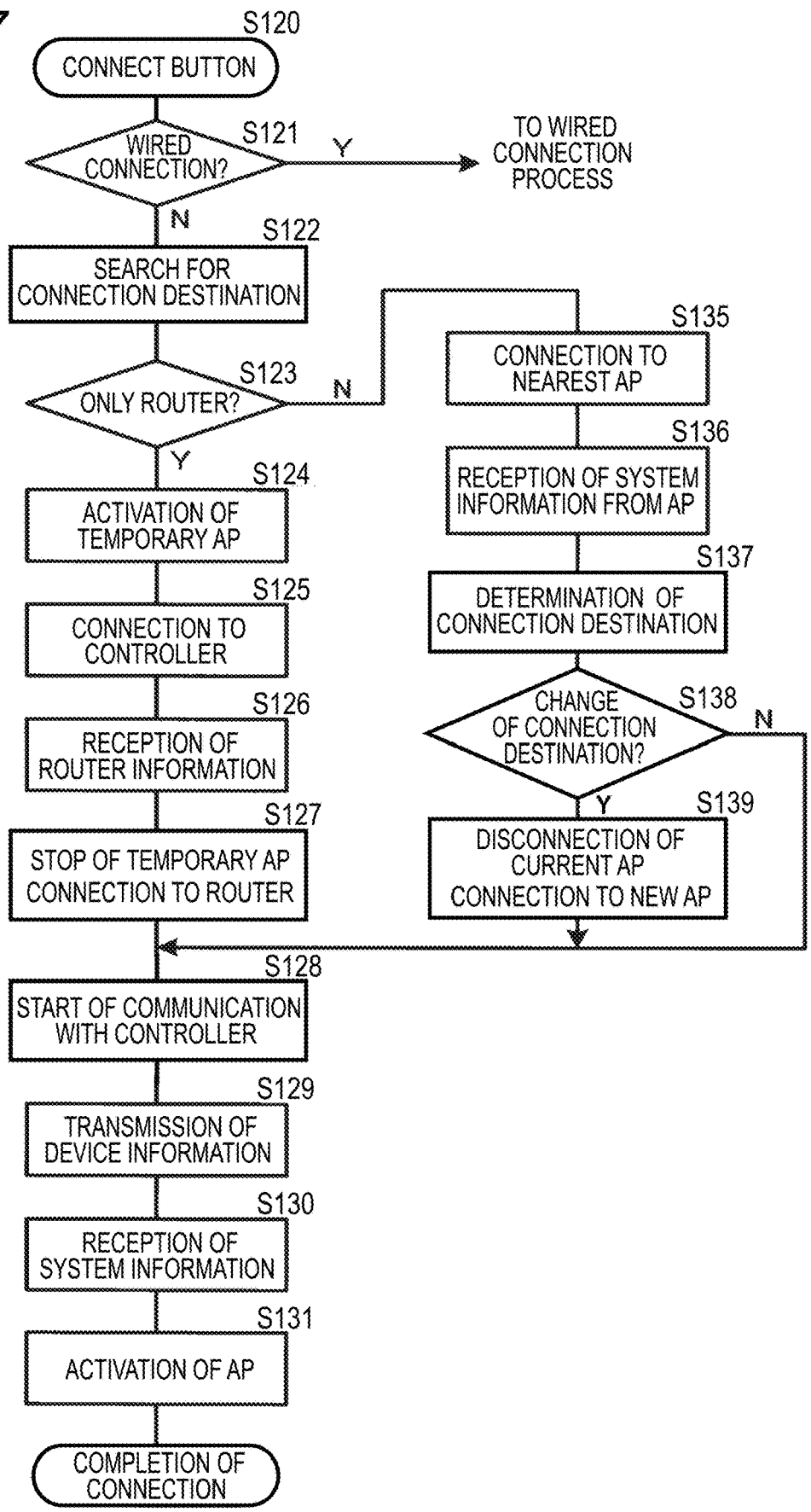
FIG. 7 is a flow chart showing the process of the control section of the audio device.

FIG. 7 is a flow chart showing the process of the control section 50 of each of the audio devices 11 to 14. When the connect button is pressed, the control section starts this process (at S120). First, the control section judges whether the audio device itself is connected to the network 3 via the wired LAN (at S121). In the case that the audio device is connected via the wired LAN (YES at S121), the process advances to a wired connection process.

In the case that the audio device is not connected via the wired LAN (NO at S121), the control section activates the wireless LAN communication section 56 and searches for a connection destination (access point) of the wireless LAN. In the case that only the router 2 is discovered as the connection destination (YES at S123), the process advances to S124. In the case that the access points of the audio system other than the router 2 are discovered (NO at S123), the process advances to S135.

At S124, the control section activates the access point (temporary access point) for initial connection by using the wireless LAN communication section 57 (at S124). The control section makes connection to the controller 1 that is making access to this temporary access point (at S125) and receives the router information from the controller 1 (at S126). After this, the control section stops the temporary access point and makes connection to the router 2 by using the obtained router information (at S127). The control section starts communication with the controller 1 via the router 2 and transmits to the controller 1 a message indicating that the connection to the router 2 is completed (at S128). Furthermore, the control section transmits the device information of the audio device itself (at S129) to the controller 1 and receives the system information from the controller 1 (at S130). After this, the control section activates the access point in the stealth mode on the basis of the instruction from the controller 1 (at S131).

In the case that the control section has discovered an access point other than the router 2 and the process has advanced to S135, the control section first makes connection to the nearest access point (at S135). The nearest access point may be an access point having the highest radio wave intensity. The control section receives the system information (including the router information) from this access point (audio device) (at S136). The control section determines a connection destination on the basis of the received system information (at S137). In the case that the access point having been determined as the connection destination is different from the currently connected access point (YES at S138), the control section disconnects the currently connected access point and makes connection to the access point having been determined as the connection destination (at S139). After this, the process advances to S128. In the case that the access point having been determined as the connection destination is coincident with the currently connected access point, the process directly advances to S128.

In the operations of the audio system shown in FIGS. 5 and 7, the audio device (the audio device 12) to be newly connected first makes connection to the nearest access point (the audio device 11) to obtain the system information and then determines the connection destination on the basis of the system information. The audio device to be newly connected may determine a connection destination from among the access points including the router 2 and discovered by the wireless LAN communication section 56, without making connection to the nearest access point once.

Next, the audio system table 90 will be described referring to FIG. 8. FIG. 8 is a view showing an example of the audio system table 90. The audio system table (hereafter referred to as a system table) 90 is generated and updated by the controller 1 at the time of the network connection of the audio devices 11 to 14 as described above and stored in the storage area 71 of the memory card 15 as described above.

The device information of the audio devices 11 to 14 constituting the audio system 100 has been registered in the system table 90. More specifically, MAC address 1, MAC address 2, SSID, device name, group, disposition room, connection form and service have been registered while being made correspond to the IP address of each of the audio devices 11 to 14. MAC address 1 and MAC address 2 are the MAC addresses of the wireless LAN communication sections 56 and 57. SSID is the SSID of the wireless LAN communication section 57 for communicating with other audio devices. Device name is a text data representing the name of the audio device.

Group is the information of the group to which the audio device belongs and represents a group wherein the above-mentioned content is synchronously reproduced. In this embodiment, only one group is set. Furthermore, an audio device belonging to one group is set to a synchronous reproduction master or a synchronous reproduction slave. The synchronous reproduction master performs the control the supply of an audio source to the entire group and the control of the synchronous reproduction of the audio source, and the master itself also functions as a device performing the synchronous reproduction. The synchronous reproduction slave reproduces contents according to the instructions of the synchronous reproduction master. For example, 1A shown in the figure designates an audio reproduction device belonging to the group as the synchronous reproduction master. Furthermore, 1B designates an audio reproduction device belonging to the group as a synchronous reproduction slave. Devices other than those designated by 1A and 1B are audio reproduction devices not belonging to the group. The group can be set by operating the controller 1. The details will be described later.

Disposition room is the information for specifying a room in which an audio device is disposed. More specifically, a room ID for specifying the room in which an audio device is disposed is registered. Disposition room (room ID) may merely be set beforehand to each of the audio devices 11 to 14 before the audio device is connected to the network. Connection form represents the number of hops (the number of steps from the apex in the tree-shaped connection form) as described above. Service represents the source information of contents that can be reproduced by the respective devices, such as FM broadcasting and CD (CD player).

Next, the room table 110 will be described referring to FIG. 9. FIG. 9 is a view showing an example of the room table 110. The information on the rooms in which the audio devices are disposed has been registered in the room table 110. More specifically, room name and background image have been registered while being made correspond to the room ID. Room name is a text data representing the name of a room, such as an office. Background image is an image that is used as the background image of the room selection button (area selection image) of the operation screen of the mobile phone 1 described later. For example, the file name of image data has been registered. Furthermore, the room table 110 has been stored in the storage area 72 of the memory card 15. The room name can be set arbitrarily by the user. Moreover, the background image can also be set arbitrarily. As the background image, for example, the image of an actual room or the image of a person who mainly uses the room can be set. For example, a photograph of a child can be set as the background image of a child's room. The procedures for setting these will be described later.

Figure 11A:
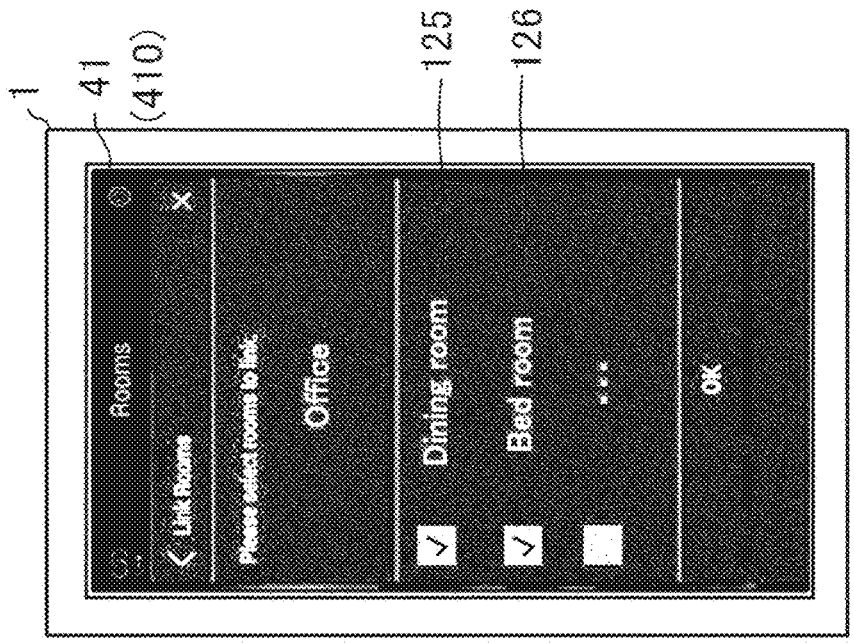
FIGS. 11A and 11B are views showing examples of the group setting screens in the operation screens of the mobile phone.
Figure 11B:
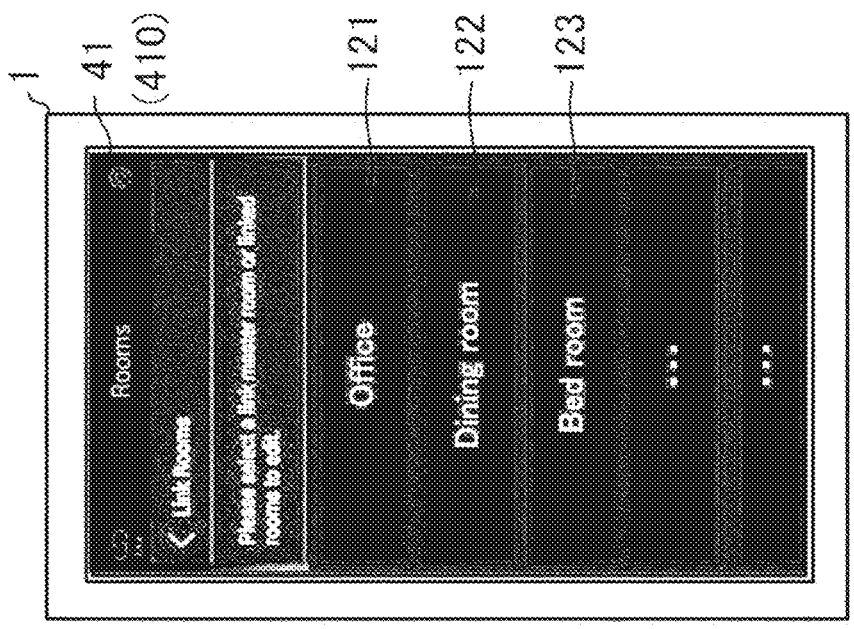
Figure 12B:
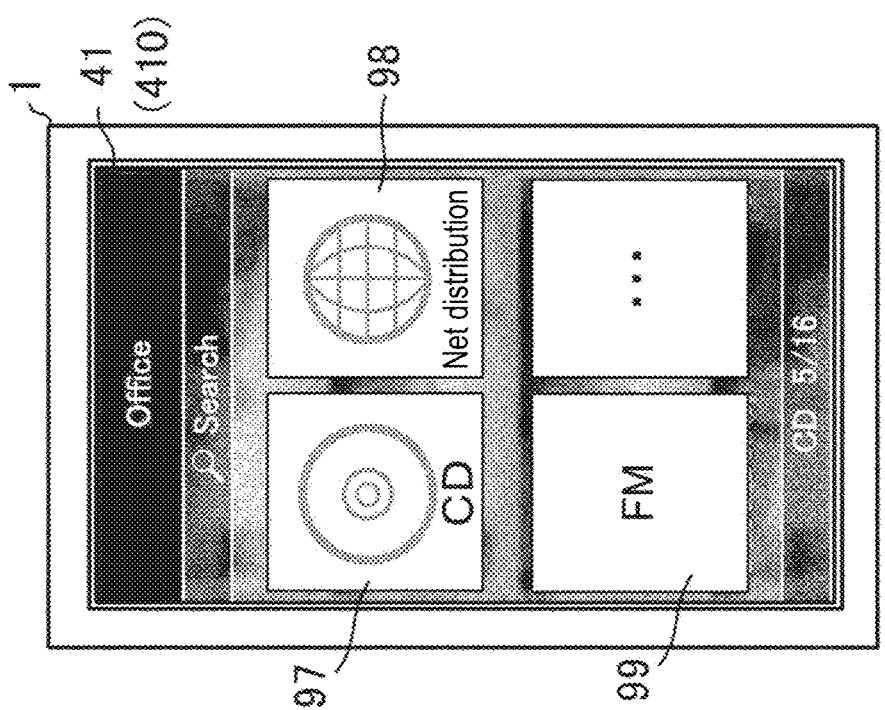
FIGS. 12A and 12B are views showing examples of the room selection screen and the source selection screen in the operation screens of the mobile phone.
Figure 12A:
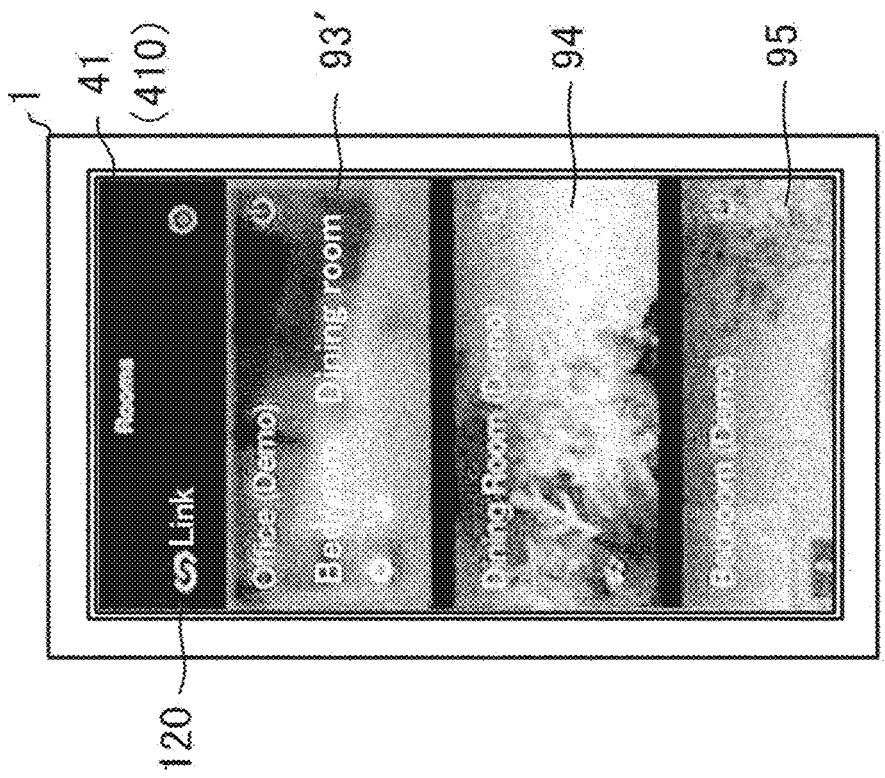

Next, the operation screens of the mobile phone 1 in the audio system 100 will be described referring to FIGS. 10A to 12B. FIGS. 10A to 10D are views showing examples of the operation screens of the mobile phone 1. FIGS. 11A and 11B are views showing examples of the group setting screens in the operation screens of the mobile phone 1. FIGS. 12A and 12B are views showing examples of the room selection screen and the source selection screen in the operation screens of the mobile phone 1.

As described above, the controller 1 is achieved by the collaboration of the mobile phone 1 and the audio system control program 70. The controller 1 displays the operation screens on the display section 41. First, the image of the initial menu screen shown in FIG. 10A is displayed. When the user selects the setup button 91 by touching the touch panel 410 (the operation section 30), the above-mentioned setup mode is started. Furthermore, when the user selects a connected device operation control 92 in a similar way, the operation control selection (for example, power ON/OFF and the selection of music files to be reproduced) for the audio devices 11 to 14 constituting the existing audio system 100 is performed. In this embodiment, the control is performed for each room. Moreover, the descriptions of the operation screens referring to FIGS. 10A to 10D are given assuming that the audio device 14 is in a state of being unable to communicate with the controller 1 (that is, in a state in which no connection operation is performed) and that no group setting is performed.

When the screen of the connected device operation control 92 is selected, a room selection screen as shown in FIG. 10B is displayed. The room selection screen displays the room selection buttons (area selection images) corresponding to the rooms in which communicable audio devices are disposed. In FIG. 10B, three room selection buttons 93 to 95 are displayed. The room selection button 93 is an image indicating an office and indicates the room in which the audio device 11 is disposed. The room selection button 94 is an image indicating a dining room and indicates the room in which the audio device 12 is disposed. The room selection button 95 is an image indicating a bedroom and indicates the room in which the audio device 13 is disposed. The respective room selection buttons 93 to 95 are buttons for selecting the rooms (the audio devices) wherein content reproduction is performed, for example. The room selection button indicating the living room is not displayed because the audio device 14 disposed in the living room is in a state of being unable to communicate. In addition, the above-mentioned background images are displayed on the room selection buttons 93 to 95.

Furthermore, the brightness levels of the respective selection buttons 93, 94 and 95 change depending on the ON/OFF states of the power sources of the audio devices 11 to 13 corresponding thereto. When the power source is in the OFF state, the entire image of the room selection button is displayed in a dark state. Moreover, when the power source is in the ON state, the entire image of the room selection button is displayed in a bright state. The room selection buttons 93 to 95 shown in FIG. 10B are all in the bright state, indicating that the power sources of the audio devices 11 to 13 corresponding thereto are in the ON state.

What's more, each of the room selection buttons 93 to 95 includes a power source button 96 accepting the input of the ON/OFF operation of the power source corresponding to each of the audio devices 11 to 13. For example, the ON/OFF state of the power source of the audio device 11 is switched by touching the power source button 96 of the room selection button 93.

In the case that the power sources are in the ON state (bright display), the room selection buttons 93 to 95 can be selected by touch operation. When any one of the room selection buttons 93 to 95 is selected (by touching the central portion thereof), the source selection screen for_the selected room is displayed. For example, in the case that the room selection button 93 is selected, the source selection screen for the office shown in FIG. 10C is displayed. On the source selection screen, icon buttons (source selection images) 97 to 99 indicating reproducible (serviceable) sources are displayed by checking, for example, the connection states of the external devices (the optical disc reproducing device and the USB memory) of the audio device corresponding to the selected room.

Furthermore, the same background image as the background image of the room selection button is displayed as the background on the source selection screen. Since FIG. 10C is the source selection screen for the office, the same background image as that of the room selection button 93 is displayed, and the icon buttons 97 to 99 are superimposed with this background image.

The icon button 97 is an image indicating CD. The icon button 98 is an image indicating net distribution through the distribution server 5. The icon button 99 is an image indicating FM. By the selection of one of the icon buttons 97 to 99, the reproduction of the selected source is instructed.

For example, when the icon button 97 of FIG. 10C is selected, a CD reproduction screen as shown in FIG. 10D is displayed. The reproduction, volume control, etc. of a music piece (music piece data) of the CD can be performed by touching each icon displayed on this reproduction screen.

Next, the group setting for synchronous reproduction will be described. In the group setting, the audio device (synchronous reproduction master) serving as the master for synchronous reproduction and the other audio devices (synchronous reproduction slaves) are selected. In this embodiment, the selection of the above-mentioned audio devices is performed for each room. The group setting is started by selecting the link button 120 shown in FIG. 10B.

When the link button 120 is selected, a synchronous reproduction master selection screen as shown in FIG. 11A is displayed. On the synchronous reproduction master selection screen, the master room selection buttons 121 to 123 for selecting the synchronous reproduction master are displayed. For example, when the master room selection button 121 is selected, the office becomes the master room, and the audio device 11 becomes the synchronous reproduction master.

After that, a synchronous reproduction slave selection screen as shown in FIG. 11B is displayed. On the synchronous reproduction slave selection screen, the slave room selection buttons 125 and 126 for selecting the synchronous reproduction slaves are displayed. By the touch operation of the slave selection buttons 125 and 126, check icons are displayed in the check boxes, whereby the slaves are selected. For example, when the slave room selection buttons 125 and 126 are touched, the dining room and the bedroom become slave rooms, and the audio devices 12 and 13 become synchronous reproduction slaves. And then, by the selection of the determination (OK) button, the audio devices belonging to the group are finally determined (the setting is completed). This group information is registered (updated) in the audio system table 90.

After the completion of the group setting, the display returns from the group setting screen shown in FIG. 11B to the room selection screen. On the room selection screen in the case that the group setting is present, the information of the group is reflected to the display mode as shown in FIG. 12A. FIG. 12A is an example of a room selection screen in a state in which the above-mentioned office is the master room, and the dining room and the bedroom belong to the group as slave rooms. This room selection screen displays the room names (text data) of the slave rooms on the room selection button 93' for the office serving as the master room, and displays the background images specified in the room table 110 such that the images are blurred (processed), thereby being different in comparison with the room selection screen shown in FIG. 10B. Hence, the user can easily distinguish the room selection buttons forming a group from the ordinary room selection buttons, whereby the master room is easily specified (synchronous reproduction is easily selected). Furthermore, since the entire atmosphere of the room selection screen of FIG. 10B is maintained, the user does not mix up with other operation screens.

Moreover, in the case that the group setting is present, the room selection buttons 94 and 95 for the slave rooms cannot be selected. (However, the power source buttons can be controlled individually, and even if the group setting has been performed, the power source buttons 96 of the room selection buttons 94 and 95 can be operated individually; furthermore, the power source ON/OFF operation of the entire group can be controlled collectively by operating the power source button 96 of the room selection button 93 for the group master.) The reason for this is that, in the synchronous reproduction in the group, only the content serving as the source of the audio device 11 of the master room is synchronously reproduced. When the room selection button 93' for the office is selected on the room selection screen shown in FIG. 12A, the source selection screen as shown in FIG. 12B is displayed. What's more, the information of the group is also reflected to the room selection screen. In comparison with FIG. 10C, the background image is blurred. Hence, the screen can easily be recognized as the source selection screen for synchronous reproduction.

After that, for example, when the icon button 97 indicating CD is selected on the source selection screen shown in FIG. 12B, a CD reproduction screen similar to the screen shown in FIG. 10D is displayed, and synchronous reproduction can be carried out. A general technology as described in JP-A-2015-100085 may merely be applied to the control for the synchronous reproduction, and its detailed descriptions are herein omitted.

Figure 13:
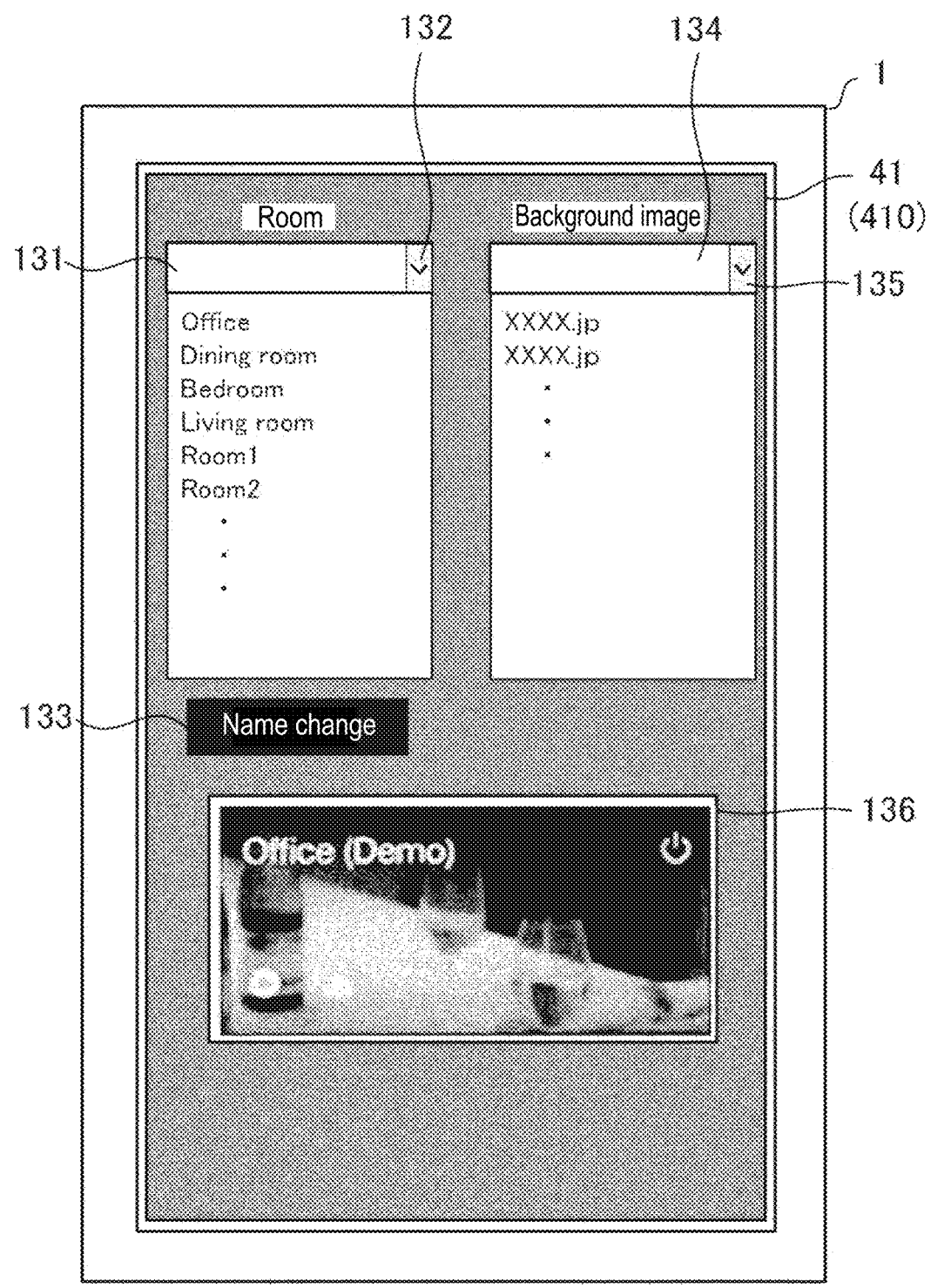
FIG. 13 is a view showing an example of a setting screen for setting room names and background images in the operation screen of the controller.

Next, the setting of room names and background images on the room selection screen of the controller 1 in the audio system 100 will be described referring to FIG. 13. FIG. 13 is a view showing an example of a setting screen for setting room names and background images in the operation screen of the controller 1. The name of each room can be changed from the initially set name by setting a room name. In addition, the background images of the room selection buttons and the like can be changed from the initial setting by setting background images.

First, the setting of a room name will be described. When the user selects, for example, a room setting button (not shown) on the room selection screen, the setting screen shown in FIG. 13 is displayed on the display section 41. When the user selects the pull-down button 132 of a "room" selection window 131, a list of room names as shown in FIG. 13 is pull-down displayed. The user selects one room from the list. And then, when the user selects a name change button 133, a keyboard image (not shown) is displayed, and the user can input a name by touch operation. After that, when the user selects a determination (OK) button (not shown), the change (setting) of the room name to the input name is finally determined. As a result, the information of the room names of the room table 110 is updated.

Next, the setting of a background image will be described. After selecting one room from the above-mentioned list of room names having been pull-down displayed, when the user selects the pull-down button 135 of a "background image" selection window 134, a list of file names of selectable images (candidate images) is pull-down displayed as shown in FIG. 13. And then, when the user selects one image file from the list, the image of the selected image file is displayed in a display window 136. After that, when the user selects a determination (OK) button (not shown), the change (setting) of the background image to the selected candidate image is finally determined. As a result, the information of the background image of the room table 110 is updated.

All of the image data stored in the storage section (the memory card 15 or the like) of the controller 1 may be used as the background images (candidate images). For example, in addition to the background images having been prepared in advance, the images taken by the user using the camera (not shown) built in the mobile phone 1 can also be used as the background images. Hence, the image of the actual room in which an audio device is disposed can also be set as a background image.

Figure 14:
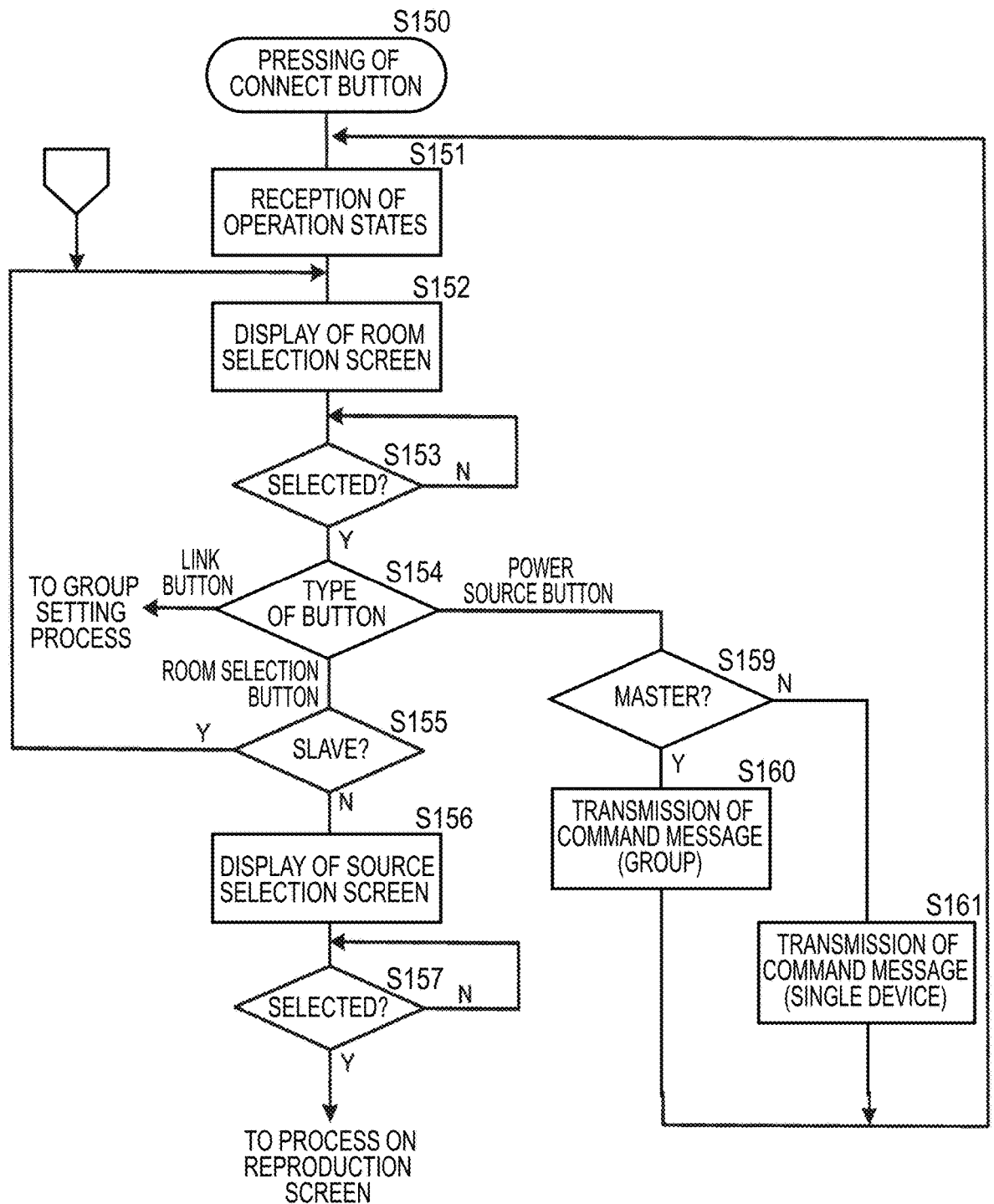
FIG. 14 is a flow chart showing the screen transferring process of the control section of the controller.

Next, the process for transferring the room selection screen to the reproduction screen of the controller 1 in the audio system 100 will be described referring to FIG. 14. FIG. 14 is a flow chart showing the screen transferring process of the control section 20 of the controller 1. When the connected device operation control 92 is pressed by the user (at S150), this process is started. The following descriptions are provided assuming that the devices capable of communicating with the controller 1 are the audio devices 11 to 13.

First, the control section receives the operation states from the respective audio devices 11 to 13 having started communication. More specifically, the control section obtains the power ON/OFF states of the power sources of the audio devices 11 to 13, the reproduction states of contents, etc. Next, the control section causes the display section 41 to display the room selection screen as shown in FIG. 10B (at S152). The control section then stands by until any one of the buttons is selected on the room selection screen (at S153). When any one of the buttons is selected (YES at S153), the control section performs the process corresponding to the selected button (at S154). In the case that the link button 120 is selected, the control section performs the group setting process described later. Alternatively, in the case that any one of the room selection buttons 93 to 95 is selected, the control section judges whether the room corresponding to the selected room selection button is a slave room (at S155). More specifically, the control section makes a judgment referring to the group information of the system table 90. In the case that the room is a slave room (YES at S155), the process returns to step S152.

Furthermore, in the case that the room is not a slave room (NO at S155), the control section causes the display section 41 to display the source selection screen for the room corresponding to the selected room selection button as shown in FIG. 10C (at S156). More specifically, the control section causes the display section to display the source selection screen on the basis of the service information of the system table 90, the room table 110, etc. of the audio device corresponding to the selected room selection button. Then, the control section stands by until an icon button indicating a source as shown in FIG. 10C is selected (at S157). When an icon button is selected (YES at S157), the reproduction screen corresponding to the selected icon button (source), as shown in FIG. 11D, is displayed, and the process on the reproduction screen proceeds.

Moreover, in the case that the power source button 96 is selected at S154, the control section judges whether the room corresponding to the selected power source button 96 is a slave room or a master room (at S159). In the case that the power source button is the power source button 96 of the master room (YES at S159), the control section transmits a command message corresponding to the current state of the power source to all the audio devices of the rooms belonging to the same group (at S160), and the process returns to step S151. For example, in the case that the power source button 96 of the office shown in FIG. 12A is selected, the same command message is transmitted to the audio devices 11 to 13 of the office, the dining room and the bedroom. The content of the command message may merely be determined on the basis of the current state of the power source of the audio device of the master room. For example, in the case that the audio device 11 of the office is in the power ON state and even in the case that the audio device 12 of the dining room is in the power OFF state, a command message including a power OFF command is transmitted to the audio devices 11 to 13 of the same group. What's more, in the case of a slave room or a room not belonging to the group (NO at S159), the command message corresponding to the current state of the power source is transmitted to only the audio device of the room corresponding to the selected power source button 96 (at S161). For example, in the case that the current state of the power source is in the OFF state, a command message including a power ON command is transmitted. The process then returns to step S151.

Figure 15:
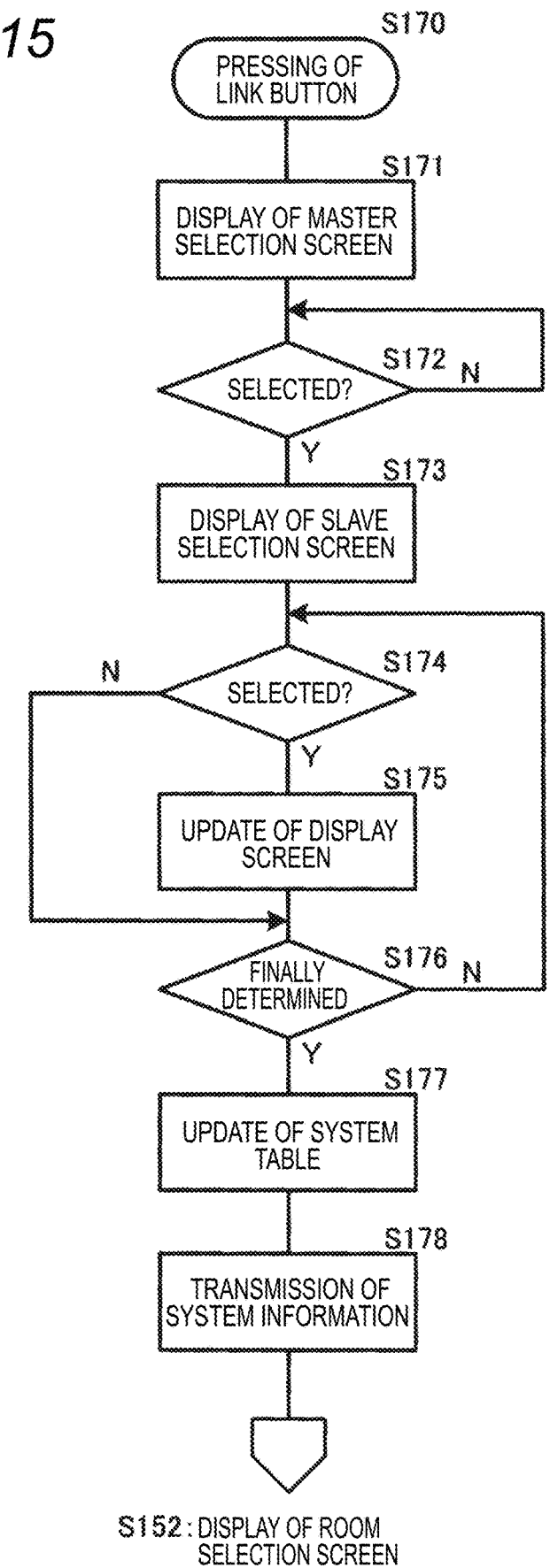
FIG. 15 is a flow chart showing the group setting process of the control section of the controller.

Next, the group setting process of the controller 1 in the audio system 100 will be described referring to FIG. 15. FIG. 15 is a flow chart showing the group setting process of the control section 20 of the controller 1. When the link button 120 is pressed by the user (at S170), this process is started.

First, the control section causes the display section 41 to display the synchronous reproduction master selection screen as shown in FIG. 11A (at S171) and stands by until the master room is selected (at S172). When the master room is selected (YES at S172), the control section causes the display section 41 to display the synchronous reproduction slave selection screen as shown in FIG. 11B (at S173). And then, each time a slave room is selected (YES at S174), the control section updates the display of the synchronous reproduction slave selection screen (at S175). In other words, the control section updates the screen so that a check is added to the check box of the selected room. Furthermore, the control section repeatedly carries out the processes of S174 and S175 until the selection is finally determined (at S176). When the selection is finally determined (YES at S176), the control section updates the system table 90 on the basis of the result of the selection (at S177). After that, the control section transmits the updated system table 90 to all the communicable audio devices 11 to 13 (at S178). Hence, each of the audio devices 11 to 13 obtains information as to whether the audio device belongs to a group or whether the audio device becomes the synchronous reproduction master and can perform synchronous reproduction. After that, the process advances to step S152, and the room selection screen is displayed. At the time, the information of the group updated at S177 is reflected to the room selection screen as shown in FIG. 12A.

Figure 16:
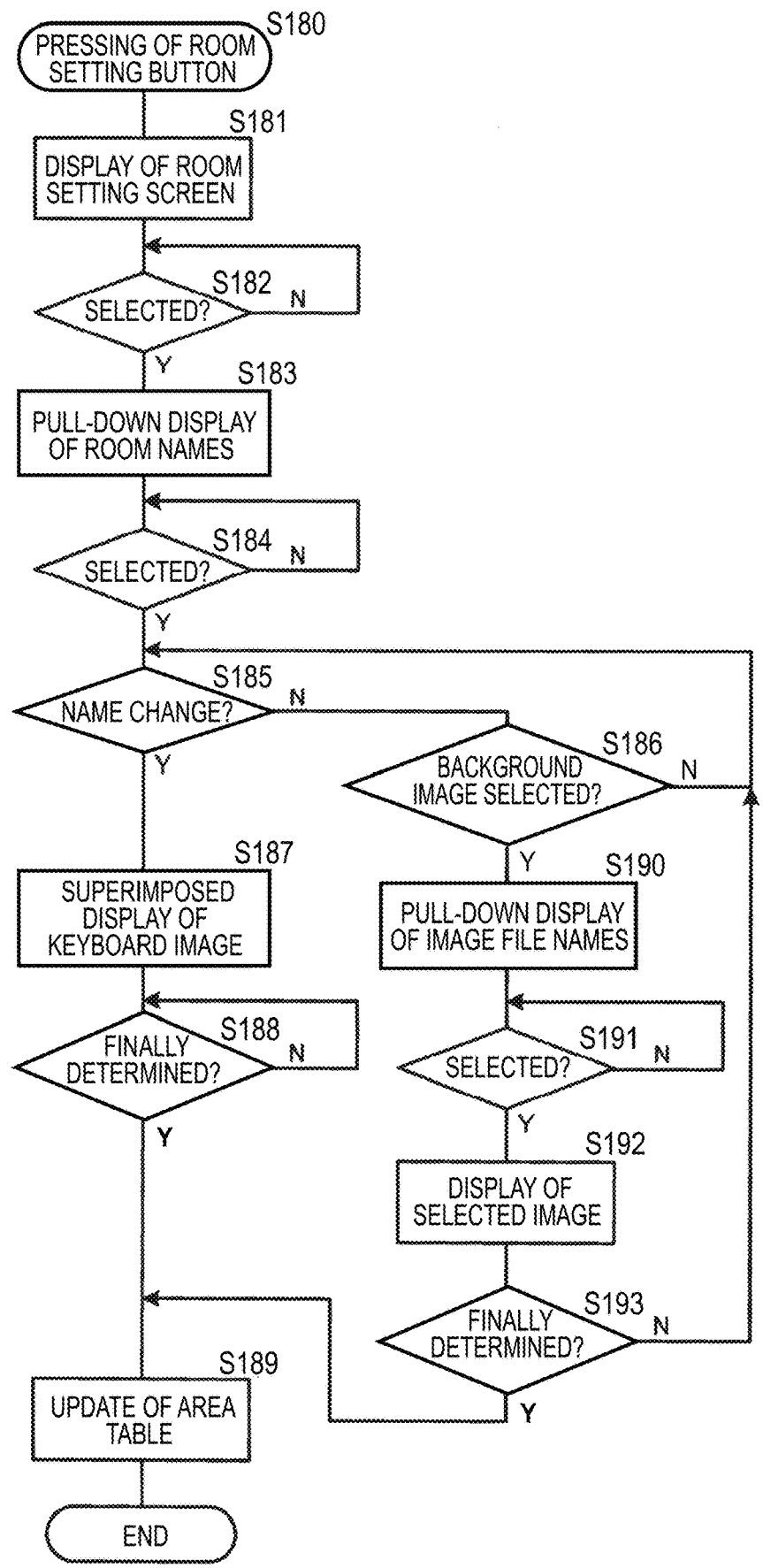
FIG. 16 is a flow chart showing the room setting process of the control section of the controller.

Next, the room setting process of the controller 1 in the audio system 100 will be described referring to FIG. 16. FIG. 16 is a flow chart showing the room setting process of the control section 20 of the controller 1. When the room setting button is pressed by the user (at S180), the process is started.

First, the control section causes the display section 41 to display the setting screen as shown in FIG. 13 (at S181) and stands by until the pull-down button 132 of the room selection window 131 is selected (at S182). When the pull-down button 132 is selected (YES at S182), the control section causes the display section 41 to pull-down display the list of the room names (at S183) and stands by until one room is selected (at S184). When one room is selected (YES at S184), the control section stands by until the name change button 133 is pressed or until the pull-down button 135 of the selection window 134 of the background image is pressed (at S185 and S186).

When the name change button 133 is pressed (YES at S185), the control section causes the display section 41 to display the keyboard image so as to be superimposed (at S187) and stands by until a name is input and the OK button is pressed so that the input is finally determined (at S188). After the input is finally determined (YES at S188), the control section updates the room table 110 on the basis of the content of the finally determined input (at S189).

Furthermore, when the pull-down button 135 of the selection window 134 for the background image is pressed (YES at S186), the control section causes the display section 41 to pull-down display the file names of the candidate images of the background image (at S190) and stands by until one file is selected (at S191). When one file is selected (YES at S191), the control section causes the display window 136 to display the image of the selected file (at S192). And then, when the OK button is pressed and the input is finally determined (YES at S193), the control section updates the room table 110 (at S179). Furthermore, in the case that the OK) button is not pressed (NO at S193), the process returns to step S185.

As described above, audio device selection can be performed easily for each room (area) in which an audio device is disposed by causing the mobile phone to function as the controller. Moreover, since the display mode of the room selection button (area selection image) can be changed on the basis of the information of the group, for example, such that the background image thereof is blurred, it is possible to easily specify which room is set in the group.

In the above-mentioned embodiment, although only one group can be set, a plurality of groups may be set. Furthermore, in the above-mentioned embodiment, although the selection is made possible for each room as an area, the area is not limited only to a room. For example, a floor of a building may also be set as an area, or two rooms may be set as one area.

Furthermore, in the above-mentioned embodiment, although the audio system table is generated at the time when an audio device is connected to the network, the generation of the table is not particularly limited to this method. The user may directly input required information to the controller 1 or the like. Moreover, for example, required information may be obtained by performing broadcasting to the devices inside the network 3 after the connection to the network.

Still further, in the above-mentioned embodiment, although the configuration in which only the audio devices capable of functioning as the synchronous reproduction master are used has been described, if at least one audio device capable of functioning as the synchronous reproduction master is included in the audio system, audio devices not equipped with the function may be included.

In the above-mentioned embodiment, although music pieces are mainly taken and explained as examples of contents to be reproduced, contents other than music pieces may also be reproduced. For example, the contents may be moving pictures, television images and radio sound. Although the above-mentioned embodiment has been described by using the audio devices for reproducing audio data, such as music pieces and sound, not only audio devices but also devices having functions for reproducing video data, such as moving pictures and still pictures, may also be used; in other words, devices having a communication function (communication devices) may also be used.

With the present invention, a communication device desired to be operated can be selected easily for each area in which a communication device is disposed.

What is claimed is:

1. A control terminal device comprising:
   a display;
   at least one processor; and
   a memory configured to store instructions that, when executed by the at least one processor, cause the control terminal device to:
   transmit command messages to a plurality of communication devices, the plurality of communication devices being disposed in respective areas and being connected via a network; and
   display, on the display, an operation screen, a device selection screen for selecting any one of the plurality of communication devices, and area images indicating the respective areas in which the plurality of communication devices are disposed, so as to serve as a selection operation section for selecting among the plurality of communication devices, wherein
   when one of the area images is selected, the at least one processor displays, instead of the device selection screen, a source selection screen for selecting an audio source that can be reproduced by the communication device disposed in the respective area indicated by the selected one area image; and
   wherein the source selection screen includes a source selection operation section corresponding to one or each of a plurality of audio sources, and
   wherein a background of the source selection screen is formed by the selected one area image.

2. The control terminal device according to claim 1, wherein
   the memory is configured to store a plurality of candidate images serving as candidates to be the area images; and
   wherein the at least one processor displays an image selection screen for selecting from among the candidate images the area image of each area, and displays the selected candidate image as the area image of the area on the device selection screen.

3. The control terminal device according to claim 1, wherein
   the at least one processor displays a display group setting screen for selecting a master device by which an audio source is selected on the source selection screen and for selecting a slave device that receives sound of the audio source selected for the master device via the network, and synchronously reproduces the sound; and
   wherein when a group setting is performed, the at least one processor changes a display mode of the area image corresponding to a selected master device on the device selection screen or changes contents to be displayed in the selection operation section of the master device.

4. An audio system comprising:
   a plurality of audio devices disposed in respective areas; and
   a control terminal device mutually connected with the plurality of audio devices via a network, wherein
   the control terminal device comprises
   a display;
   at least one processor; and
   a memory configured to store instructions that, when executed by the at least one processor, cause the control terminal device to:

transmit command messages to a plurality of communication devices, the plurality of communication devices being disposed in respective areas and being connected via the network; and display, on the display, an operation screen, a device selection screen for selecting any one of the plurality of communication devices, and area images indicating the respective areas in which the plurality of communication devices are disposed, so as to serve as a selection operation section for selecting among the plurality of communication devices, wherein when one of the area images is selected, the at least one processor displays, instead of the device selection screen, a source selection screen for selecting an audio source that can be reproduced by the communication device disposed in the respective area indicated by the selected one area image; and wherein the source selection screen includes a source selection operation section corresponding to one or each of the plurality of audio sources, and wherein a background of the source selection screen is formed by the selected one area image.

5. An audio system control method comprising:

transmitting command messages to a plurality of communication devices disposed in respective areas and mutually connected via a network;

displaying a device selection screen for selecting any one of the plurality of communication devices; and displaying area images indicating the respective areas in which the plurality of communication devices are disposed so as to serve as a selection operation section for selecting among the plurality of communication devices on the device selection screen, wherein when one of the area images is selected, displaying, instead of the device selection screen, a source selection screen for selecting an audio source that can be reproduced by the communication device disposed in the respective area indicated by the selected one area image, and wherein the source selection screen includes a source selection operation section corresponding to one or each of a plurality of audio sources, and wherein a background of the source selection screen is formed by the selected one area image.

6. The audio system control method according to claim 5, further comprising:

displaying an image selection screen for selecting, from among a plurality of candidate images, the area image of each area; and displaying the selected candidate image for each area as the area image of the area on the device selection screen.

7. The audio system control method according to claim 5, further comprising:

displaying a group setting screen for selecting a master device by which an audio source is selected on the source selection screen and for selecting a slave device that receives sound of the audio source selected for the master device via the network, wherein the slave device synchronously reproduces the sound; and when a group setting is performed, changing a display mode of the area image corresponding to a selected master device on the device selection screen or changing contents to be displayed in the selection operation section of the master device.

* * * * *